United States Patent
Choi et al.

(10) Patent No.: US 9,766,818 B2
(45) Date of Patent: Sep. 19, 2017

(54) ELECTRONIC SYSTEM WITH LEARNING MECHANISM AND METHOD OF OPERATION THEREOF

(71) Applicant: Samsung Electronics Co., Ltd., Suwon-si, Gyeonggi-Do (KR)

(72) Inventors: Inseok Stephen Choi, Redwood City, CA (US); Yang Seok Ki, Palo Alto, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 32 days.

(21) Appl. No.: 14/877,421

(22) Filed: Oct. 7, 2015

(65) Prior Publication Data
US 2016/0188207 A1 Jun. 30, 2016

Related U.S. Application Data

(60) Provisional application No. 62/099,067, filed on Dec. 31, 2014.

(51) Int. Cl.
*G06F 3/06* (2006.01)
*G06N 3/063* (2006.01)
*G06N 99/00* (2010.01)

(52) U.S. Cl.
CPC .......... *G06F 3/061* (2013.01); *G06F 3/0644* (2013.01); *G06F 3/0685* (2013.01); *G06N 3/063* (2013.01); *G06N 99/005* (2013.01)

(58) Field of Classification Search
CPC ...... G06F 3/061; G06F 3/0613; G06F 3/0646; G06F 3/067; G06F 3/0683; G06F 3/0685; G06F 9/4436; G06F 9/50; G06F 12/0866; G06F 12/0868; G06N 3/04; G06N 3/063; G06N 3/088
See application file for complete search history.

(56) References Cited

U.S. PATENT DOCUMENTS

| | | | |
|---|---|---|---|
| 8,819,335 B1 | 8/2014 | Salessi et al. | |
| 2009/0024816 A1* | 1/2009 | Thibadeau | G06F 3/061 711/167 |
| 2009/0150593 A1* | 6/2009 | Hamilton | G06F 3/061 711/101 |
| 2013/0060993 A1 | 3/2013 | Park et al. | |
| 2013/0151443 A1 | 6/2013 | Kyaw et al. | |
| 2013/0290223 A1* | 10/2013 | Chapelle | G06F 15/18 706/12 |
| 2014/0277604 A1 | 9/2014 | Nixon et al. | |
| 2016/0078361 A1* | 3/2016 | Brueckner | H04L 67/10 706/12 |
| 2016/0358099 A1* | 12/2016 | Sturlaugson | G06N 99/005 |

* cited by examiner

*Primary Examiner* — Hal Schnee
(74) *Attorney, Agent, or Firm* — IP Investment Law Group

(57) ABSTRACT

An electronic system includes: a storage interface configured to receive system information; a storage control unit, coupled to the storage interface, configured to implement a preprocessing block for partitioning data based on the system information; and a learning block for processing partial data of the data for distributing machine learning processes.

21 Claims, 17 Drawing Sheets

ELECTRONIC SYSTEM WITH LEARNING MECHANISM AND METHOD OF OPERATION THEREOF

CROSS-REFERENCE TO RELATED APPLICATION(S)

This application claims the benefit of U.S. Provisional Patent Application Ser. No. 62/099,067 filed Dec. 31, 2014, and the subject matter thereof is incorporated herein by reference thereto.

TECHNICAL FIELD

An embodiment of the present invention relates generally to an electronic system, and more particularly to a system with machine learning.

BACKGROUND

Modern consumer and enterprise electronics, especially devices such as graphical display systems, televisions, projectors, cellular phones, portable digital assistants, client workstations, data center servers, and combination devices, are providing increasing levels of functionality to support modern life. Research and development in the existing technologies can take a myriad of different directions.

The increasing levels of functionality typically require increasing memory and storage processing. Processor and memory capacity and bandwidth can be key factors in increasing device or system performance and functionality. As with other electronic components or modules, area and cost of memory are traded off with performance and functionality.

Processing large amounts of data can improve device or system performance and functionality. Unfortunately processing large amounts of data can consume a large amount of system bandwidth, introduce system access conflicts, and consume system resources, all of which reduce the system performance and functionality.

Thus, a need still remains for an electronic system with learning mechanism for processing large amounts of data to improve system performance. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a storage interface configured to receive system information; a storage control unit, coupled to the storage interface, configured to implement a preprocessing block for partitioning data based on the system information; and a learning block for processing partial data of the data for distributing machine learning processes.

An embodiment of the present invention provides a method of operation of an electronic system including: receiving system information with a storage interface; partitioning data, with a storage control unit configured to implement a preprocessing block, based on the system information; and distributing machine learning for processing partial data of the data, with the storage control unit configured to implement a learning block.

An embodiment of the present invention provides a non-transitory computer readable medium including stored thereon instructions to be executed by a control unit including: receiving system information with a storage interface; partitioning data, with a storage control unit configured to implement a preprocessing block, based on the system information; and distributing machine learning processes for processing partial data of the data, with the storage control unit configured to implement a learning block coupled to a storage block with the data the partial data.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
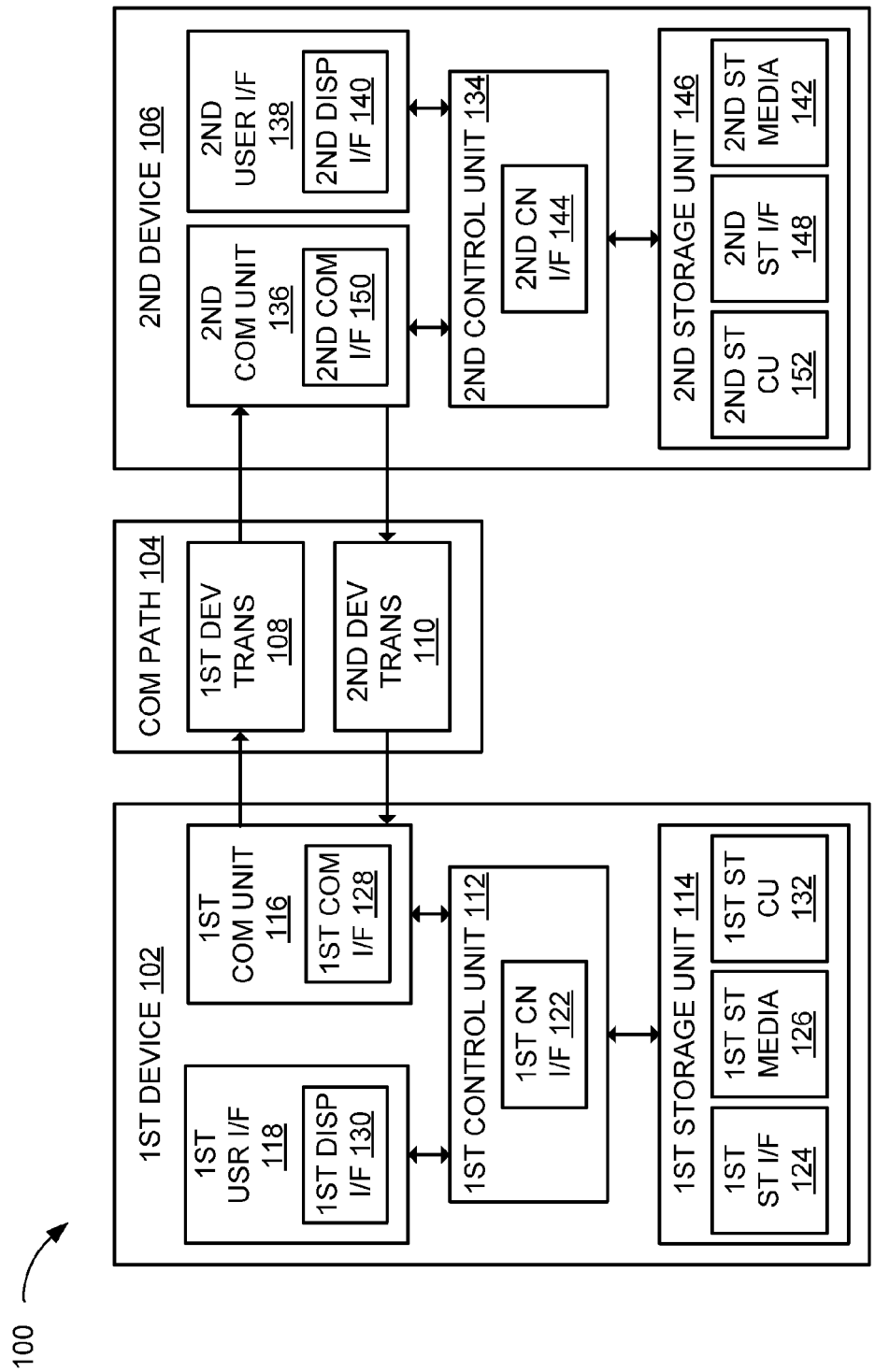
FIG. 1 is an electronic system in an embodiment of the invention.

In an embodiment of the invention, learning systems can include machine learning that can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can include classification, regression, feature learning, online learning, unsupervised learning, supervised learning, clustering, dimensionality reduction, structured prediction, anomaly detection, neural nets, or combination thereof.

In an embodiment of the invention, a learning system can include machine learning systems that can process or analyze "big data". Parallel or distributed storage devices with in storage computing (ISC) can accelerate big data machine learning and analytics. This parallel or distributed learning system can offload functions to ISC for additional bandwidth and reduce input and output (I/O) for the storage and host processor. This parallel or distributed learning system can provide machine learning with ISC.

In an embodiment of the invention, a parallel or distributed learning system can be implemented with in storage computing (ISC), a scheduler, or combination thereof. ISC can provide significant improvements in the learning system including parallel or distributed learning. ISC can provide another processor for machine learning, an accelerator for assisting a host central processing unit, or combination thereof, such as preprocessing at an ISC to relieve a bandwidth bottleneck once detected. The scheduler can intelligently assign data, tasks, functions, operations, or combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

Referring now to FIG. 1, therein is shown an electronic system 100 in an embodiment of the invention. The electronic system 100 with learning mechanism includes a first device 102, such as a client or a server, a communication path 104, such as a wireless or wired network, or combination thereof. The first device 102 can couple with a second device 106, such as a client or server. The first device 102 can couple with the communication path 104 to couple with the second device 106. For example, the first device 102, the second device 106, or combination thereof, can be of any of a variety of devices, such as a client, a server, display device, a node of a cluster, a node of super computers, a cellular phone, personal digital assistant, a notebook computer, other multi-functional device, or combination thereof. The first device 102 can couple, either directly or indirectly, to the communication path 104 to communicate with the second device 106 or can be a stand-alone device.

For illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path.

In an embodiment, the communication path 104 can span and represent a variety of networks. For example, the communication path 104 can include system bus, wireless communication, wired communication, optical, ultrasonic, or the combination thereof. Peripheral Component Interconnect Express (PCIe), Peripheral Component Interconnect (PCI), Industry Standard Architecture (ISA), Serial Advanced Technology Attachment (SATA), Small Computer Serial Interface (SCSI), Enhanced Integrated Drive Electronics (EIDE), Non-Volatile Memory host controller interface, Non-Volatile Memory express (NVMe) interface, Serial Attached Advanced Technology Attachment express (SATAe), and accelerated graphics port (AGP), are examples of system bus technologies. Satellite, cellular, Bluetooth, and wireless fidelity (WiFi), are examples of wireless communication. Ethernet, 10 Gigabit Ethernet, 40 Gigabit Ethernet, 100 Gigabit Ethernet, InfiniBand™, digital subscriber line (DSL), and fiber to the home (FTTH), are examples of wired communication. All of the aforementioned can be included in the communication path 104.

In an embodiment, the first device 102 can include a first control unit 112, a first storage unit 114, a first communication unit 116, and a first user interface 118. The first control unit 112 can include a first control interface 122. The first control unit 112 can execute a first software of a first storage media 126 to provide the intelligence of the electronic system 100. The first control unit 112 can be implemented in a number of different manners.

For example, the first control unit 112 can be a processor, an application specific integrated circuit (ASIC), a field programmable gate array (FPGA), a system on a chip (SOC), an embedded processor, a microprocessor, multi-processors, chip-multiprocessor(s) (CMP), a hardware control logic, a hardware finite state machine (FSM), a digital signal processor (DSP), or a combination thereof. The first control interface 122 can be used for communication between the first control unit 112 and other functional units in the first device 102. The first control interface 122 can also be used for communication that is external to the first device 102.

In an embodiment, the first control interface 122 can receive information from the other functional units or from external sources, or can transmit information to the other functional units or to external destinations. The external sources and the external destinations refer to sources and destinations external to the first device 102. The first control interface 122 can be implemented in different ways and can include different implementations depending on which functional units or external units are being interfaced with the first control interface 122. For example, the first control interface 122 can be implemented with a pressure sensor, an inertial sensor, a microelectromechanical system (MEMS), optical circuitry, waveguides, wireless circuitry, wireline circuitry, or a combination thereof.

In an embodiment, the first storage unit 114 can store the first software of the first storage media 126. The first storage unit 114 can also store the relevant information, such as data including images, information, sound files, any form of social network day, user profiles, behavior data, cookies, any form of a large collection of user data, or a combination thereof. The first storage unit 114 can be a volatile memory, a nonvolatile memory, an internal memory, an external memory, or a combination thereof. For example, the first storage unit 114 can be a nonvolatile storage such as non-volatile random access memory (NVRAM), non-volatile memory (NVM), non-volatile memory express (NVMe), Flash memory, disk storage, or a volatile storage such as static random access memory (SRAM).

In an embodiment, the first storage unit 114 can include a first storage interface 124. The first storage interface 124 can be used for communication between and other functional units in the first device 102. The first storage interface 124 can also be used for communication that is external to the first device 102. The first storage interface 124 can receive information from the other functional units or from external sources, or can transmit information to the other functional units or to external destinations. The external sources and the external destinations refer to sources and destinations external to the first device 102.

In an embodiment, the first storage interface 124 can include different implementations depending on which functional units or external units are being interfaced with the first storage unit 114. The first storage interface 124 can be implemented with technologies and techniques similar to the implementation of the first control interface 122.

In an embodiment, the first communication unit 116 can enable external communication to and from the first device 102. For example, the first communication unit 116 can permit the first device 102 to communicate with the second device 106 of FIG. 1, an attachment, such as a peripheral device or a computer desktop, and the communication path 104. The first communication unit 116 can also function as a communication hub allowing the first device 102 to function as part of the communication path 104 and not limited to be an end point or terminal unit to the communication path 104. The first communication unit 116 can include active and passive components, such as microelectronics or an antenna, for interaction with the communication path 104.

In an embodiment, the first communication unit 116 can include a first communication interface 128. The first communication interface 128 can be used for communication between the first communication unit 116 and other functional units in the first device 102. The first communication interface 128 can receive information from the other functional units or can transmit information to the other functional units. The first communication interface 128 can include different implementations depending on which functional units are being interfaced with the first communication unit 116. The first communication interface 128 can be implemented with technologies and techniques similar to the implementation of the first control interface 122.

In an embodiment, the first user interface 118 allows a user (not shown) to interface and interact with the first device 102. The first user interface 118 can include an input device and an output device. Examples of the input device of the first user interface 118 can include a keypad, a mouse, a touchpad, soft-keys, a keyboard, a microphone, an infrared sensor for receiving remote signals, a virtual display console for remote access, a virtual display terminal for remote access, or any combination thereof to provide data and communication inputs. In an embodiment, the first user interface 118 can include a first display interface 130. The first display interface 130 can include a display, a projector, a video screen, a speaker, a remote network display, a virtual network display, or any combination thereof.

In an embodiment, the first storage interface 124 in a manner similar to the first control interface 122, can receive, process, transmit, or combination thereof, information from the other functional units, external sources, external destinations, or combination thereof, for a first storage control unit 132. The first storage control unit 132 can be a processor, an application specific integrated circuit (ASIC), a system on a chip (SOC), an embedded processor, a microprocessor, multi-processors, chip-multiprocessor(s) (CMP), a hardware control logic, a hardware finite state machine (FSM), a digital signal processor (DSP), a field programmable gate array (FPGA), or a combination thereof.

In an embodiment, the second device 106 can be optimized for implementing an embodiment of the present invention in a multiple device embodiment with the first device 102. The second device 106 can provide the additional or higher performance processing power compared to the first device 102. The second device 106 can include a second control unit 134, a second communication unit 136, and a second user interface 138.

In an embodiment, the second user interface 138 allows a user (not shown) to interface and interact with the second device 106. The second user interface 138 can include an input device and an output device. Examples of the input device of the second user interface 138 can include a keypad, a mouse, a touchpad, soft-keys, a keyboard, a microphone, a virtual display console for remote access, a virtual display terminal for remote access, or any combination thereof to provide data and communication inputs. Examples of the output device of the second user interface 138 can include a second display interface 140. The second display interface 140 can include a display, a projector, a video screen, a speaker, a remote network display, a virtual network display, or any combination thereof.

In an embodiment, the second control unit 134 can execute a second software of a second storage media 142 to provide the intelligence of the second device 106 of the electronic system 100. The second software of the second storage media 142 can operate in conjunction with the first software of the first storage media 126. The second control unit 134 can provide additional performance compared to the first control unit 112. The second control unit 134 can operate the second user interface 138 to display information. The second control unit 134 can also execute the second software of the second storage media 142 for the other functions of the electronic system 100, including operating the second communication unit 136 to communicate with the first device 102 over the communication path 104.

In an embodiment, the second control unit 134 can be implemented in a number of different manners. For example, the second control unit 134 can be a processor, an application specific integrated circuit (ASIC), a field programmable gate array (FPGA), a system on a chip (SOC), an embedded processor, a microprocessor, multi-processors, chip-multi-processor(s) (CMP), a hardware control logic, a hardware finite state machine (FSM), a digital signal processor (DSP), or a combination thereof. The second control unit 134 can include a second controller interface 144. The second controller interface 144 can be used for communication between the second control unit 134 and other functional units in the second device 106. The second controller interface 144 can also be used for communication that is external to the second device 106.

In an embodiment, the second controller interface 144 can receive information from the other functional units or from external sources, or can transmit information to the other functional units or to external destinations. The external sources and the external destinations refer to sources and destinations external to the second device 106. The second controller interface 144 can be implemented in different ways and can include different implementations depending on which functional units or external units are being interfaced with the second controller interface 144. For example, the second controller interface 144 can be implemented with a pressure sensor, an inertial sensor, a microelectromechanical system (MEMS), optical circuitry, waveguides, wireless circuitry, wireline circuitry, or a combination thereof.

In an embodiment, a second storage unit 146 can store the second software on the second storage media 142. The second storage unit 146 can also store the relevant information such as data including images, information, sound files, any form of social network day, user profiles, behavior data, cookies, any form of a large collection of user data, or a combination thereof. The second storage unit 146 can be sized to provide the additional storage capacity to supplement the first storage unit 114. For illustrative purposes, the second storage unit 146 is shown as a single element, although it is understood that the second storage unit 146 can be a distribution of storage elements. Also for illustrative purposes, the electronic system 100 is shown with the second storage unit 146 as a single hierarchy storage system, although it is understood that the electronic system 100 can have the second storage unit 146 in a different configuration.

For example, the second storage unit 146 can be formed with different storage technologies forming a memory hierarchal system including different levels of caching, main memory, rotating media, or off-line storage. The second storage unit 146 can be a volatile memory, a nonvolatile memory, an internal memory, an external memory, or a combination thereof. Further for example, the second storage unit 146 can be a nonvolatile storage such as non-volatile random access memory (NVRAM), Flash memory, disk storage, or a volatile storage such as static random access memory (SRAM).

In an embodiment, the second storage unit 146 can include a second storage interface 148. The second storage interface 148 can be used for communication between other functional units in the second device 106. The second storage interface 148 can also be used for communication that is external to the second device 106.

In an embodiment, the second storage interface 148 can receive information from the other functional units or from external sources, or can transmit information to the other functional units or to external destinations. The external sources and the external destinations refer to sources and destinations external to the second device 106. The second storage interface 148 can include different implementations depending on which functional units or external units are being interfaced with the second storage unit 146. The second storage interface 148 can be implemented with technologies and techniques similar to the implementation of the second controller interface 144. The second communication unit 136 can enable external communication to and from the second device 106. For example, the second communication unit 136 can permit the second device 106 to communicate with the first device 102 over the communication path 104.

In an embodiment, the second communication unit 136 can also function as a communication hub allowing the second device 106 to function as part of the communication path 104 and not limited to be an end point or terminal unit to the communication path 104. The second communication unit 136 can include active and passive components, such as microelectronics or an antenna, for interaction with the communication path 104. The second communication unit 136 can include a second communication interface 150. The second communication interface 150 can be used for communication between the second communication unit 136 and other functional units in the second device 106. The second communication interface 150 can receive information from the other functional units or can transmit information to the other functional units.

In an embodiment, the second communication interface 150 can include different implementations depending on which functional units are being interfaced with the second communication unit 136. The second communication interface 150 can be implemented with technologies and techniques similar to the implementation of the second controller interface 144. The first communication unit 116 can couple with the communication path 104 to send information to the second device 106 in the first device transmission 108. The second device 106 can receive information in the second communication unit 136 from the first device transmission 108 of the communication path 104.

In an embodiment, the second communication unit 136 can couple with the communication path 104 to send information to the first device 102 in the second device transmission 110. The first device 102 can receive information in the first communication unit 116 from the second device transmission 110 of the communication path 104. The electronic system 100 can be executed by the first control unit 112, the second control unit 134, or a combination thereof.

For illustrative purposes, the second device 106 is shown with the partition having the second user interface 138, the second storage unit 146, the second control unit 134, and the second communication unit 136, although it is understood that the second device 106 can have a different partition. For example, the second software of the second storage media 142 can be partitioned differently such that some or all of its function can be in the second control unit 134 and the second communication unit 136. Also, the second device 106 can include other functional units not shown in FIG. 1 for clarity.

In an embodiment, the second storage interface 148 in a manner similar to the second control interface 144, can receive, process, transmit, or combination thereof, information from the other functional units, external sources, external destinations, or combination thereof, for a second storage control unit 152. The second storage control unit 152 can be a processor, an application specific integrated circuit (ASIC), a system on a chip (SOC), an embedded processor, a microprocessor, multi-processors, chip-multiprocessor(s) (CMP), a hardware control logic, a hardware finite state machine (FSM), a digital signal processor (DSP), an field programmable gate array (FPGA), or a combination thereof.

In an embodiment, the functional units in the first device 102 can work individually and independently of the other functional units. The first device 102 can work individually and independently from the second device 106 and the communication path 104. Similarly, the functional units in the second device 106 can work individually and independently of the other functional units. The second device 106 can work individually and independently from the first device 102 and the communication path 104. For illustrative purposes, the electronic system 100 is described by operation of the first device 102 and the second device 106. It is understood that the first device 102 and the second device 106 can operate any of the functions, processes, applications, or combination thereof, of the electronic system 100.

In an embodiment, the functions, processes, applications, or combination thereof, described in this application can be at least in part implemented as instructions stored on a non-transitory computer readable medium to be executed by a control unit 112. The non-transitory computer medium can include the storage unit 114. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

In an embodiment, the functions, processes, applications, or combination thereof, described in this application can be implemented as instructions stored on a non-transitory computer readable medium to be executed by a first control unit 112, the second control unit 134, or a combination thereof. The non-transitory computer medium can include the first storage unit 114, the second storage unit 146, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

In an embodiment, the functions, processes, applications, or combination thereof, described in this application can be part of the first software of the first storage media 126, the second software of the second storage media 142, or a combination thereof. These functions, processes, applications, or combination thereof, can also be stored in the first storage unit 114, the second storage unit 146, or a combination thereof. The first control unit 112, the second control unit 134, or a combination thereof can execute these functions, processes, applications, or combination thereof, for operating the electronic system 100.

In an embodiment, the electronic system 100 has been described with functions, processes, applications, order, or combination thereof, as an example. The electronic system 100 can partition the functions, processes, applications, or combination thereof, differently or order the functions, processes, applications, or combination thereof, differently. The functions, processes, applications, or combination thereof, described in this application can be hardware implementations, hardware circuitry, or hardware accelerators in the first control unit 112 or in the second control unit 134. The functions, processes, applications, or combination thereof, can also be hardware implementations, hardware circuitry, or hardware accelerators within the first device 102 or the second device 106 but outside of the first control unit 112 or the second control unit 134, respectively.

Figure 2:
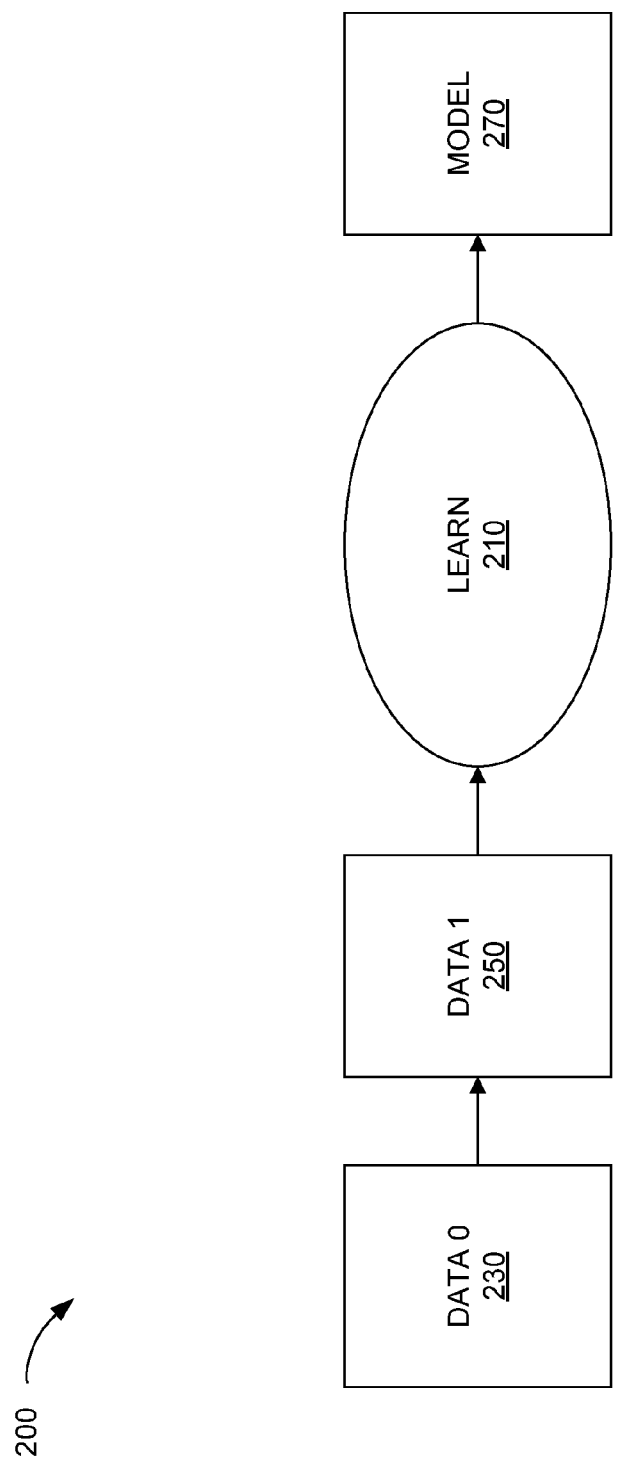
FIG. 2 is a block diagram of a portion of an electronic learning system of the electronic system in an embodiment of the invention.

Referring now to FIG. 2, therein is shown a block diagram of a portion of an electronic learning system 200 of the electronic system 100 in an embodiment of the invention. The electronic learning system 200 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 200 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 200 can provide machine learning including prediction, recommendation, filtering such as spam email filtering, machine learning processes, machine learning functions, or combination thereof. In some embodiments, prediction can be based on clicking or selecting an advertisement or advertiser, can recommend an item or items, can filter spam, can include like processes, or combination thereof, to provide machine learning such as for big data analytics.

In an embodiment, the electronic learning system 200 can also include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the first storage media 126 of FIG. 1, the second storage media 142 of FIG. 1, the second storage unit 146 of FIG. 1, the first storage control unit 132 of FIG. 1, the second storage control unit 152 of FIG. 1, or combination thereof.

For example, the electronic learning system 200 can include a learning block 210 such as a machine learning block, an initial data block 230 such as a raw data block, a processed data block 250, a model block 270, or combination thereof. The processed data block 250 can include a partial data block of the initial data block 230, an intelligently updated data block of the initial data block 230, an intelligently selected data block of the initial data block 230, data with a different format, data with a different data structure, or combination thereof, for further processing or for main machine learning. The learning block 210, the initial data block 230, the processed data block 250, the model block 270, or combination thereof, can be implemented at least in part as hardware such as integrated circuits, integrated circuit cores, integrated circuit components, microelectromechanical system (MEMS), passive devices, or a combination thereof.

For illustrative purposes, the learning block 210, the initial data block 230, the processed data block 250, the model block 270, or combination thereof, are shown as discrete blocks although it is understood that any of the blocks can share portions of the hardware with any of the other blocks. For example, the initial data block 230, the processed data block 250, the model block 270, or combination thereof, can share portions of hardware memory circuits or components such as the first storage unit 114, the second storage unit 146, the first storage media 126, the second storage media 142, or combination thereof.

In an embodiment, the learning block 210 can provide machine learning, including parallel or distributed processing, cluster computing, or combination thereof. The learning block 210 can be implemented in system processors, storage computing (ISC) processors, the first control unit 112, the second control unit 134, the first storage control unit 132, the second storage control unit 152, the first storage unit 114, the second storage unit 146, or combination thereof.

In an embodiment, the initial data block 230 can include storage devices with raw, unprocessed, partially processed data, or combination thereof. The initial data block 230 can be implemented in storage devices, memory devices, the first storage unit 114, the second storage unit 146, the first storage media 126, the second storage media 142, or combination thereof. The processed data block 250 can include storage devices with processed data such as the unprocessed data of the initial data block 230 after processing. The processed data block 250 can be implemented in storage devices, memory devices, the first storage unit 114, the second storage unit 146, the first storage media 126, the second storage media 142, or combination thereof.

In an embodiment, the model block 270 can include storage devices. For example, the storage devices can include data, information, applications, machine learning data, analyzed big data, big data analytics, or combination thereof. The model block 270 can be implemented in storage devices, memory devices, system processors, in storage computing (ISC) processors, the first storage unit 114, the second storage unit 146, the first control unit 112, the second control unit 134, the first storage control unit 132, the second storage control unit 152, or combination thereof.

It has been discovered that controlling assignments of selected data such as the initial data 230, the first data 250, or combination thereof, can provide improved performance. Controlling assignments can include detecting communication resource saturation of input and output (I/O) bandwidth such as the communication path 104 of FIG. 1, compute resource saturation of a processor such as a central processing unit (CPU), a control unit, the first control unit 112, the second control unit 134, the first storage control unit 132, the second storage control unit 152, or combination thereof. For example, computation of the initial data 230 to the first data 250 can cause bandwidth saturation, such as limitations of capacity, with the first control unit 112, the second control unit 134, the communication path 104, interfaces, or combination thereof, which can be addressed by a preprocessing block, further described below, for assigning or allocating processing between compute devices and storage devices based on system information.

For illustrative purposes, the learning block 210, the initial data block 230, the processed data block 250, the model block 270, or combination thereof, are shown as discrete blocks although it is understood that any number, combination, distribution, division, partitioning, or combination thereof, of the blocks may be included. For example, the learning block 210 can include multiple blocks distributed across multiple devices. Additional details are provided in subsequent figure descriptions for embodiments of the learning block 210, the initial data block 230, the processed data block 250, the model block 270, or combination thereof.

Figure 3:
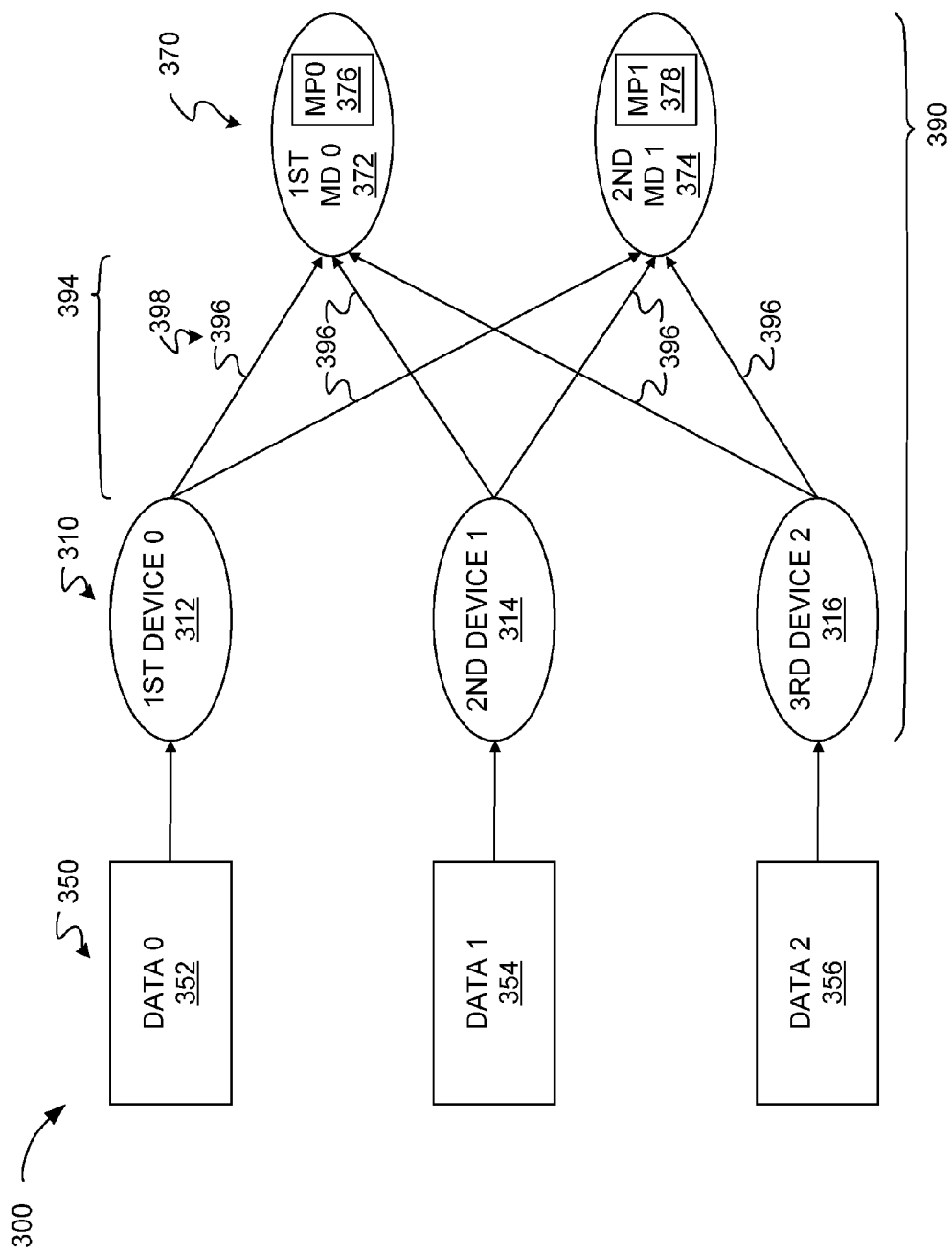
FIG. 3 is a block diagram of a portion of an electronic learning system of the electronic system in an embodiment of the invention.

Referring now to FIG. 3, therein is shown a block diagram of a portion of an electronic learning system 300 of the electronic system 100 in an embodiment of the invention. In a manner similar to the electronic system 200 of FIG. 2, the electronic learning system 300 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 300 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 300 can provide machine learning including prediction, recommendation, filtering such as spam email filtering, machine learning processes, machine learning functions, or combination thereof. In some embodiments, prediction, for example, can be based on clicking or selecting an advertisement or advertiser, can recommend an item or items, can filtering spam, can include like processes, or combination thereof, to provide machine learning such as for big data analytics.

In an embodiment, the electronic learning system 300 can also include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 300 can include learning devices 310, such as machine learning devices, including a first learning device 312, a second learning device 314, a third learning device 316, or combination thereof. The electronic learning system 300 can also include data blocks 350, such as training data block, including a first data block 352, a second data block 354, a third data block 356, or combination thereof. The electronic learning system 300 can further include model devices 370 including a first model device 372, a second model device 374, or combination thereof. The devices 310, the data blocks 350, the model devices 370, or combination thereof, are implemented at least in part as hardware such as integrated circuits, integrated circuit cores, integrated circuit components, microelectromechanical system (MEMS), passive devices, or a combination thereof.

For example, the devices 310 can be implemented with the first control unit 112, the second control unit 134, the first storage control unit 132, the second storage control unit 152, or combination thereof. The data blocks 350 can be implemented with the first storage unit 114, the second storage unit 146, the first storage media 126, the second storage media 142, or combination thereof. The model devices 370 can be implemented with the first control unit 112, the second control unit 134, the first storage control unit 132, the second storage control unit 152, the first storage unit 114, the second storage unit 146, or combination thereof. For illustrative purposes, the machine learning devices 310, the data blocks 350, the model devices 370, or combination thereof, are shown as discrete blocks although it is understood that any of the blocks can share portions of the hardware with any of the other blocks in a manner similar to the electronic learning system 200.

In an embodiment, the electronic learning system 300 can include a put model process 390 for updating, amending, revising, replacing, writing, recording, entering, or combination thereof, a model or model parameter 376 such as the first model device 372, the second model device 374, or combination thereof. The model can be updated, amended, revised, replaced, written, recorded, entered, or combination thereof, with the machine learning devices 310 on the model devices 370.

In an embodiment, the put model process 390, machine learning processes, big data process, any other process, or combination thereof, can include a network 394. For example, the network 394 can include any of a variety of networks in a manner similar to the communication path 104 of FIG. 1 and can include network transmissions 396, network capacity 398, or combination thereof. The network transmissions 396 can transmit the model or the model parameter 376. The network capacity 398 can include a quantity of the network transmissions 396 supported by the network 394.

In an embodiment, the learning system 300 can provide detecting, identifying, monitoring, measuring, checking, or combination thereof, of the network 394, the network transmissions 396, network capacity 398, or combination thereof. The learning system 300 including the learning devices 310, the data blocks 350, the model devices 370, or combination thereof can detect or identify issues or bottlenecks with the network capacity 398.

It has been discovered that the learning system 300 can detect bottlenecks in parallel or distributed machine learning systems. The learning system 300 can at least detect or identify issues with the network capacity 398.

Figure 4:
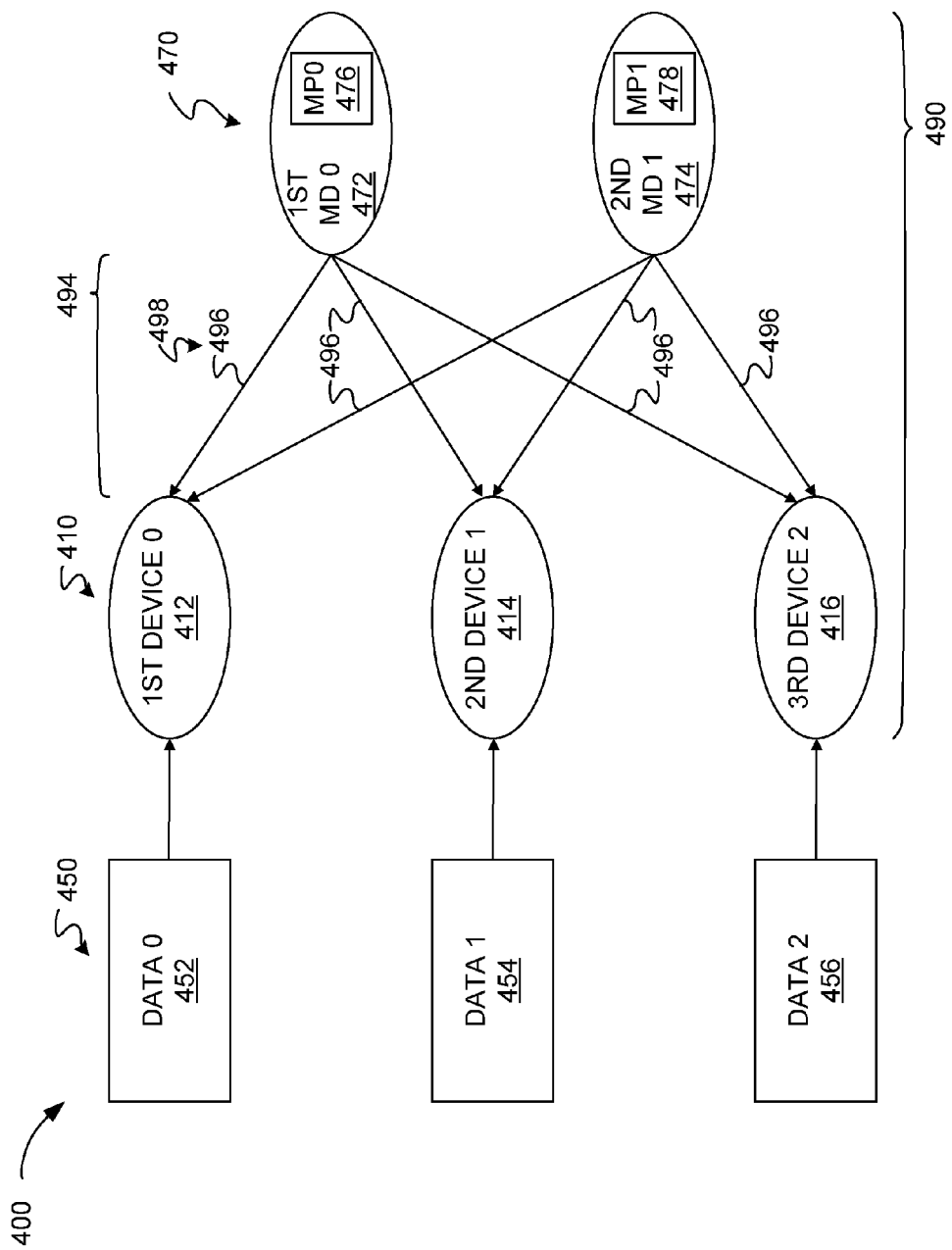
FIG. 4 is a block diagram of a portion of an electronic learning system of the electronic system in an embodiment of the invention.

Referring now to FIG. 4, therein is shown block diagram of a portion of an electronic learning system 400 of the electronic system 100 in an embodiment of the invention. In a manner similar to the electronic system 200 of FIG. 2, the electronic learning system 400 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 400 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 400 can provide machine learning including prediction, recommendation, filtering such as spam email filtering, machine learning processes, machine learning functions, or combination thereof. In some embodiments, prediction can be based on clicking or selecting an advertisement or advertiser, can recommend an item or items, can filter spam, can include like processes, or combination thereof, to provide machine learning such as for big data analytics.

In an embodiment, the electronic learning system 400 can also include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 400 can include learning devices 410, such as machine learning devices, in a manner similar to the machine learning devices 310 of FIG. 3, including a first learning device 412, a second learning device 414, a third machine device 416, or combination thereof. The electronic learning system 400 can also include data blocks 450, such as training data blocks, in a manner similar to the data blocks 350 of FIG. 3, including a first data block 452, a second data block 454, a third data block 456, or combination thereof.

In an embodiment, the electronic learning system 400 can include model devices 470, such as model servers, in a manner similar to the model devices 370 of FIG. 3, including a first model device 472, a second model device 474, or combination thereof. The machine learning devices 410, the training data blocks 450, the model devices 470, or combination thereof, can be implemented at least in part as hardware such as integrated circuits, integrated circuit cores, integrated circuit components, microelectromechanical system (MEMS), passive devices, or a combination thereof.

For example, the devices 410 can be implemented with the first control unit 112, the second control unit 134, the first storage control unit 132, the second storage control unit 152, or combination thereof. The data blocks 450 can be implemented with the first storage unit 114, the second storage unit 146, or combination thereof. The model devices 470 can be implemented with the first control unit 112, the second control unit 134, the first storage control unit 132, the second storage control unit 152, the first storage unit 114, the second storage unit 146, or combination thereof. For illustrative purposes, the machine learning devices 410, the training data blocks 450, the model devices 470, or combination thereof, are shown as discrete blocks although it is understood that any of the blocks can share portions of the hardware with any of the other blocks in a manner similar to the electronic learning system 200.

In an embodiment, the electronic learning system 400 can include a get model process 490 for extracting, acquiring, attaining, accessing, requesting, receiving, or combination thereof, a model or model parameter 476 such as the first model device 472, the second model device 474, the first model device 372, the second model device 374, or combination thereof. The model can be extracted, acquired, attained, accessed, requested, received, or combination thereof, with the learning devices 410, the learning devices 310, from the model devices 470 or the model devices 370.

In an embodiment, the get model process 490, machine learning processes, big data process, any other process, or combination thereof, can include a network 494. The network 494 can include a variety of networks in a manner similar to the communication path 104 of FIG. 1 and can include network transmissions 496, network capacity 498, or combination thereof. The network transmissions 496 can transmit the model or the model parameter 476. The network capacity 498 can include a quantity of the network transmissions 496 supported by the network 494.

In an embodiment, the learning system 400 can provide detecting, identifying, monitoring, measuring, checking, or combination thereof, of the network 494, the network transmissions 496, network capacity 498, or combination thereof. The learning system 400 including the learning devices 410, the data blocks 450, the model devices 470, or combination thereof can detect or identify issues or bottlenecks with the network capacity 498.

In an embodiment, the electronic learning system 400 can include the get model process 490, a put model process (not shown) in a manner similar to the put model process 390 of FIG. 3, machine learning processes, big data process, any other process, or combination thereof. These processes can provide combined issues, bottlenecks, or combination thereof, for the network 494. Similarly, in an embodiment, the electronic learning system 300 of FIG. 3 can include the get model process 490, the put model process 390, machine learning processes, big data process, any other process, or combination thereof, can provide combined issues, bottlenecks, or combination thereof, for the network 394 of FIG. 3.

For illustrative purposes the electronic learning system 400 and the electronic learning system 300 are shown as discrete systems although it is understood that the electronic learning system 400, the electronic learning system 300, other system, or combination thereof, can be combined in part or as a whole. For example, the electronic learning system 400 and the electronic learning system 300 can represent one system with different modes.

It has been discovered that the learning system 400 can detect bottlenecks in parallel or distributed machine learning systems. The learning system 400 can at least detect or identify issues with the network capacity 498.

Figure 5:
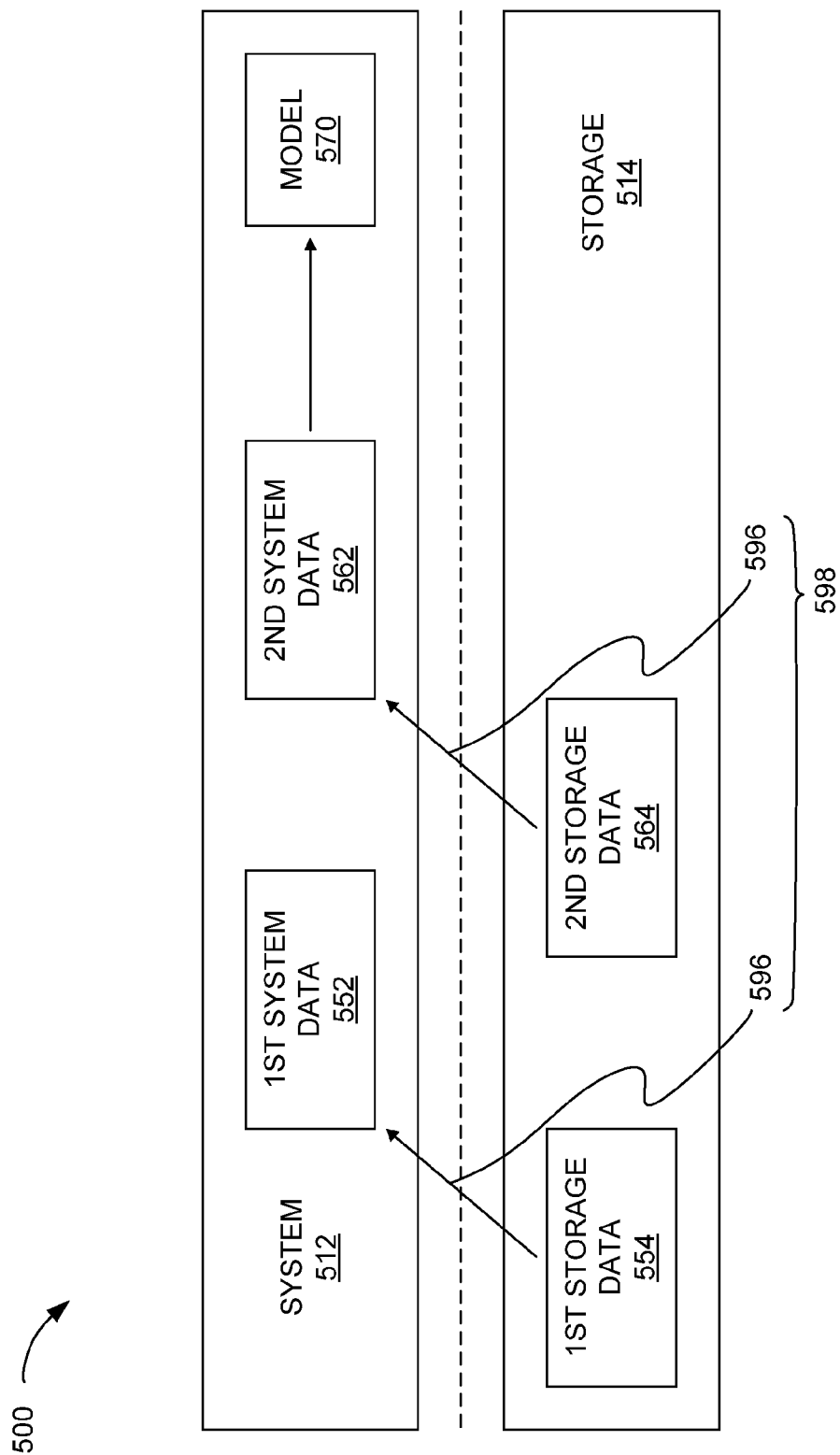
FIG. 5 is a block diagram of a portion of an electronic learning system of the electronic system in an embodiment of the invention.

Referring now to FIG. 5, therein is shown a block diagram of a portion of an electronic learning system 500 of the electronic system 100 in an embodiment of the invention. In a manner similar to the electronic system 200 of FIG. 2, the electronic learning system 500 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 500 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 500 can provide machine learning including scanning, filtering, predicting, recommending, machine learning processes, machine learning functions, big data analytics, or combination thereof. The electronic learning system 500 can also include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 500 can include a system device 512, a storage device 514, first system data 552, such as training data, first storage data 554, such as training data, or combination thereof. The electronic learning system 500 can also include second system data 562, such as training data, updated system data of the first system data 552, partial data of the first system data 552, intelligently selected data of the first system data 552, intelligently updated data of the first system data 552, or combination thereof, second storage data 564, such as training data, intelligently updated storage data of the first storage data 554, partial data of the first storage data 554, intelligently selected data of the first storage data 554, or combination thereof. The electronic learning system 500 can provide a model device 370.

In an embodiment, the electronic learning system 500 can include network transmissions 596, network capacity 598, or combination thereof. The learning system 500 can provide detecting, identifying, monitoring, measuring, checking, or combination thereof, of the network transmissions 596, network capacity 598, or combination thereof. The learning system 500 including the system device 512, the storage device 514, the first system data 552, the first storage data 554, the second system data 562, the second storage data 564, the model device 370, or combination thereof can detect or identify issues or bottlenecks with the network capacity 398.

It has been discovered that the learning system 500 can detect bottlenecks in parallel or distributed machine learning systems. The learning system 500 can at least detect or identify issues with the network capacity 598.

Figure 6:
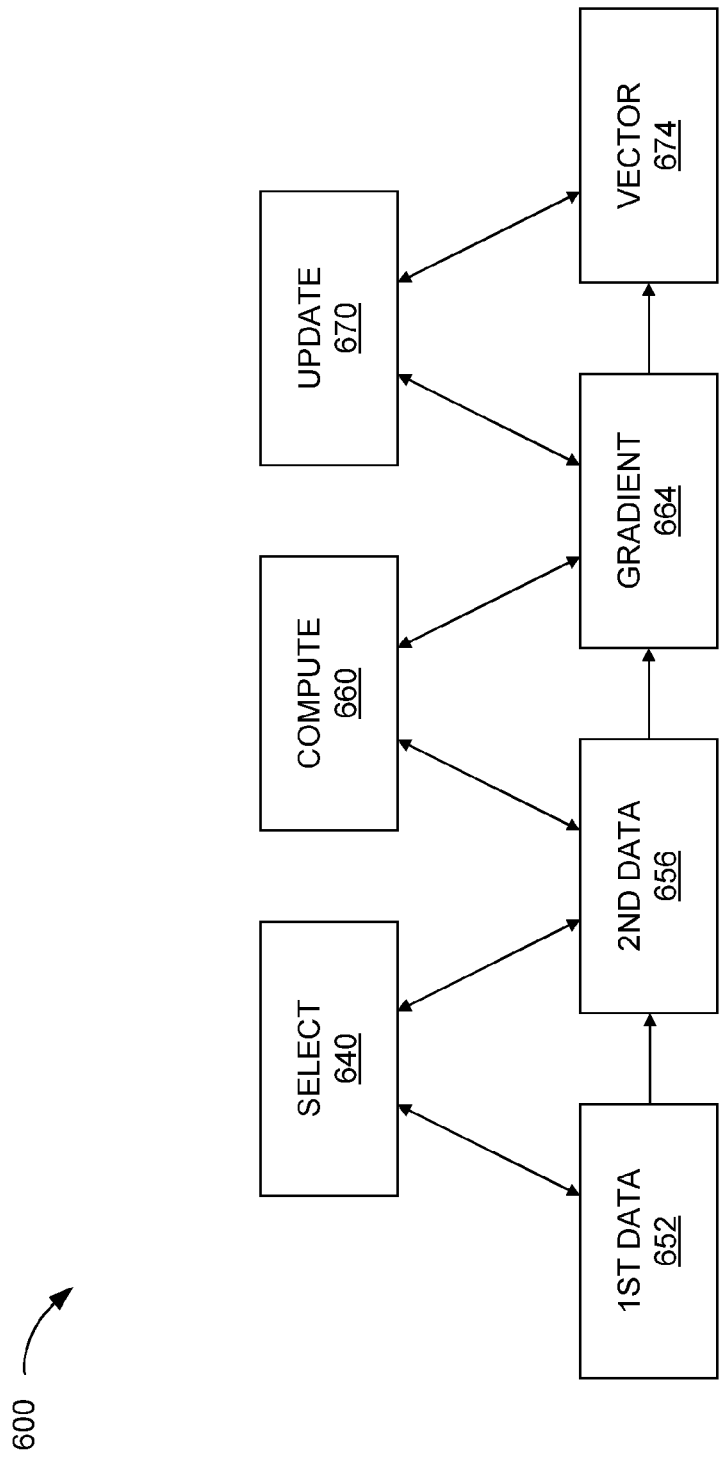
FIG. 6 is a block diagram of a portion of an electronic learning system of the electronic system in an embodiment of the invention.

Referring now to FIG. 6, therein is shown a block diagram of a portion of an electronic learning system 600 of the electronic system 100 in an embodiment of the invention. The electronic learning system 600 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 600 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 600 can provide machine learning including statistical machine learning such as a gradient descent optimization method including a Stochastic Gradient Descent (SGD). The Stochastic Gradient methods can provide faster convergence rates, improved step sizes, running multiple processors independently in parallel, or combination thereof. The Stochastic Gradient methods can also include a Stochastic Averaged Gradient algorithm providing fast initial convergence for stochastic methods, fast late-stage convergence of full-gradient methods keeping cheap iteration cost of stochastic gradients, or combination thereof.

In an embodiment, the electronic learning system 600 can include a select block 640 that can provide machine learning processes such as data selection, batch selection, random batch selection, or combination thereof. The select block 640 can receive, process, select, partition, transmit, or combination thereof. For example, the select block 640 can process first data 652 such as training data, second data 656 such as partial data of the first data 652, intelligently updated data of the first data 652, intelligently selected data of the first data 652, or combination thereof. Also for example, the select block 640 can select or partition the second data 656 from the first data 652.

In an embodiment, the electronic learning system 600 can also include a compute block 660 for computing a gradient 664, an update block 670 for updating at least a vector 674 of a model, or combination thereof. The update block 670 can also update an entirety of the model including vectors 674. The select block 640, the compute block 660, and the update block 670 can be implemented at least in part as hardware such as integrated circuits, integrated circuit cores, integrated circuit components, microelectromechanical system (MEMS), passive devices, or a combination thereof.

In an embodiment, the electronic learning system 600 with the select block 640, the compute block, the update block 670, or combination thereof, can provide machine learning including big data machine learning, big data analytics, or combination thereof. The select block 640, the compute block, the update block 670, or combination thereof, can select, partition, or combination thereof, data, processes, functions, or combination thereof. The selection, partition, or combination thereof, can provide offloading, such as offload of machine learning processes or machine learning functions to in storage computing (ISC). The offloading can provide distributing or partitioning of functions with high computation complexity, high input and output (I/O) overhead, or combination thereof.

For illustrative purposes, the select block 640, the compute block 660, the update block 670, or combination thereof, are shown as discrete blocks although it is understood that any of the blocks can share portions of the hardware with any of the other blocks. For example, the select block 640, the compute block 660, the update block 670, or combination thereof, can share portions of hardware memory circuits or components such as the first control unit 112, the second control unit 134, the first storage unit 114, the second storage unit 146, or combination thereof.

Further for illustrative purposes, the select block 640, the compute block 660, the update block 670, or combination thereof, are shown as discrete blocks, although it is understood that any number, combination, distribution, division, partitioning, or combination thereof, of the blocks may be included. For example, the select block 640, the compute block 660, the update block 670, or combination thereof, can each include multiple blocks distributed across multiple devices.

It has been discovered that the electronic learning system 600 of the electronic system 100 with the select block 640, the compute block 660, and the update block 670, or combination thereof, can provide offload of machine learning processes or machine learning functions. Functions with high computation complexity, high input and output (I/O) overhead, or combination thereof, can be at least partially distributed or partitioned to in storage computing (ISC).

Figure 7:
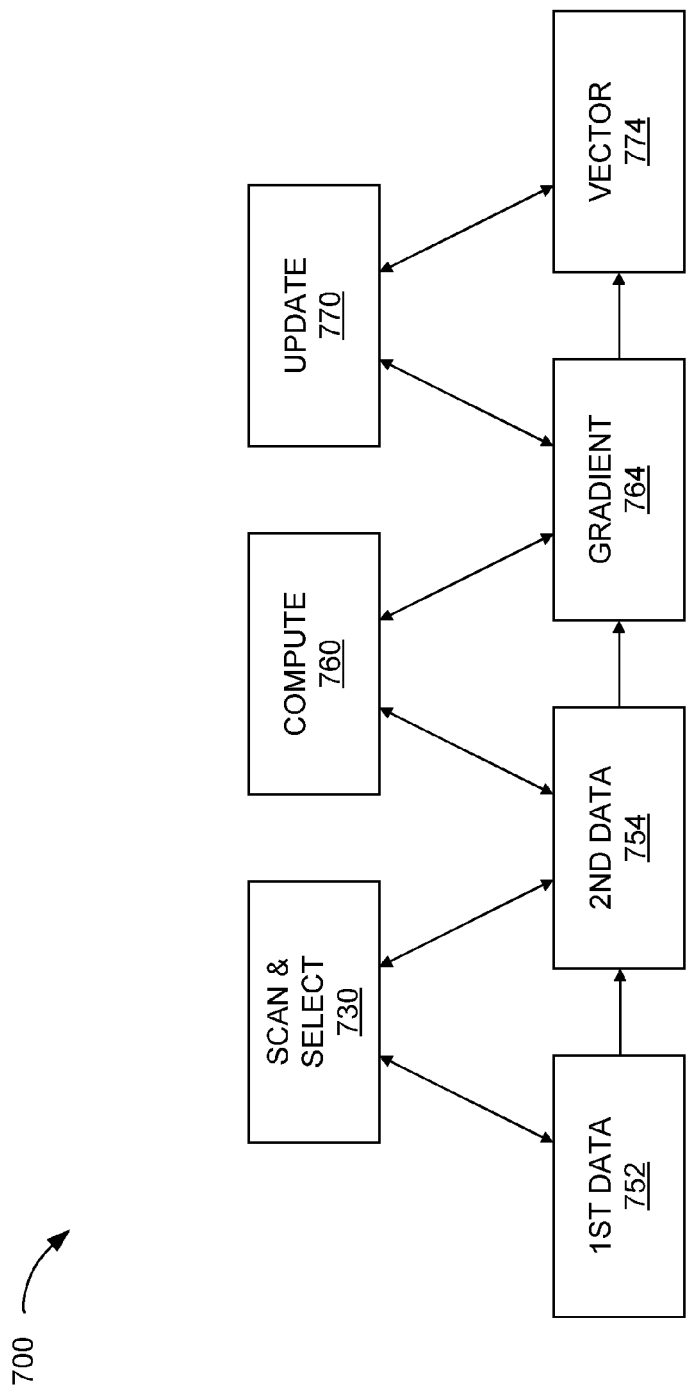
FIG. 7 is a block diagram of a portion of a storage device of the electronic system in an embodiment of the invention.

Referring now to FIG. 7 therein is shown a block diagram of a portion of an electronic learning system 700 of the electronic system 100 in an embodiment of the invention. The electronic learning system 700 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 700 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 700 can provide machine learning including intelligently selecting or partitioning data, such as training data, for providing significantly improved partial data for machine learning including parallel or distributed machine learning. The significantly improved partial data can improve updating a model, vector, or combination thereof. The intelligent selection or partitioning can provide faster convergence with increased input and output (I/O).

For example, in a manner similar to the electronic learning system 600, the electronic learning system 700 can provide statistical machine learning such as statistical machine learning such as gradient descent optimization method including a Stochastic Gradient Descent (SGD). The Stochastic Gradient methods, including a Stochastic Averaged Gradient algorithm, can provide a faster convergence rate, improved step sizes, multiple processors independently run in parallel, fast initial convergence, fast late-stage convergence of full-gradient methods keeping cheap iteration cost of stochastic gradients, or combination thereof.

In an embodiment, the electronic learning system 700 can include a scan and select block 730 that can provide machine learning processes such as scanning, selecting, or combination thereof. The scan and select block 730 can receive, scan, process, select, partition, transmit, or combination thereof. For example, the scan and select block 730 can intelligently process, including scan, select, partition, data selection, batch selection, random batch selection, or combination thereof, first data 752 such as raw data, input data for preprocessing training data, second data 754 such as preprocessed data, intelligently selected training data of the first data 752, partial data of the first data 752, intelligently updated data of the first data 752, intelligently selected data of the first data 752, or combination thereof. Also for example, the scan block 730 can intelligently select or partition the second data 754 from the first data 752.

In an embodiment, the electronic learning system 700 can also include a compute block 760 for computing a gradient 764, an update block 770 for updating at least a vector 774 of a model including vectors 774. The update block 770 can also update an entirety of the model. The scan and select block 730, the compute block 760, and the update block 770 can be implemented at least in part as hardware such as integrated circuits, integrated circuit cores, integrated circuit components, microelectromechanical system (MEMS), passive devices, or a combination thereof.

For example, the electronic learning system 700 with the scan and select block 730, the compute block, the update block 770, or combination thereof, can provide machine learning including big data machine learning, big data analytics, or combination thereof. The scan and select block 730, the compute block, the update block 770, or combination thereof, can select, partition, or combination thereof, data, processes, functions, or combination thereof. The selection, partition, or combination thereof, can provide offloading, such as offload of machine learning processes or machine learning functions to in storage computing (ISC). The offloading can provide distributing or partitioning of functions with high computation complexity, high input and output (I/O) overhead, or combination thereof.

For illustrative purposes, the scan and select block 730, the compute block 760, the update block 770, or combination thereof, are shown as discrete blocks although it is understood that any of the blocks can share portions of the hardware with any of the other blocks. For example, the scan and select block 730, the compute block 760, the update block 770, or combination thereof, can share portions of hardware memory circuits or components such as the first control unit 112, the second control unit 134, the first storage unit 114, the second storage unit 146, or combination thereof.

Further for illustrative purposes, the scan and select block 730, the compute block 760, the update block 770, or combination thereof, are shown as are shown as discrete blocks although it is understood that any number, combination, distribution, division, partitioning, or combination thereof, of the blocks may be included. For example, the scan and select block 730, the compute block 760, the update block 770, or combination thereof, can each include multiple blocks distributed across multiple devices.

It has been discovered that the electronic learning system 700 of the electronic system 100 with the scan and select block 730, the compute block 760, and the update block 770, or combination thereof, can intelligently provide offload of machine learning processes or machine learning functions, particularly functions with increased input and output (I/O). Functions with high computation complexity, high input and output (I/O) overhead, or combination thereof, can be at least partially distributed or partitioned to in storage computing (ISC).

Figure 8:
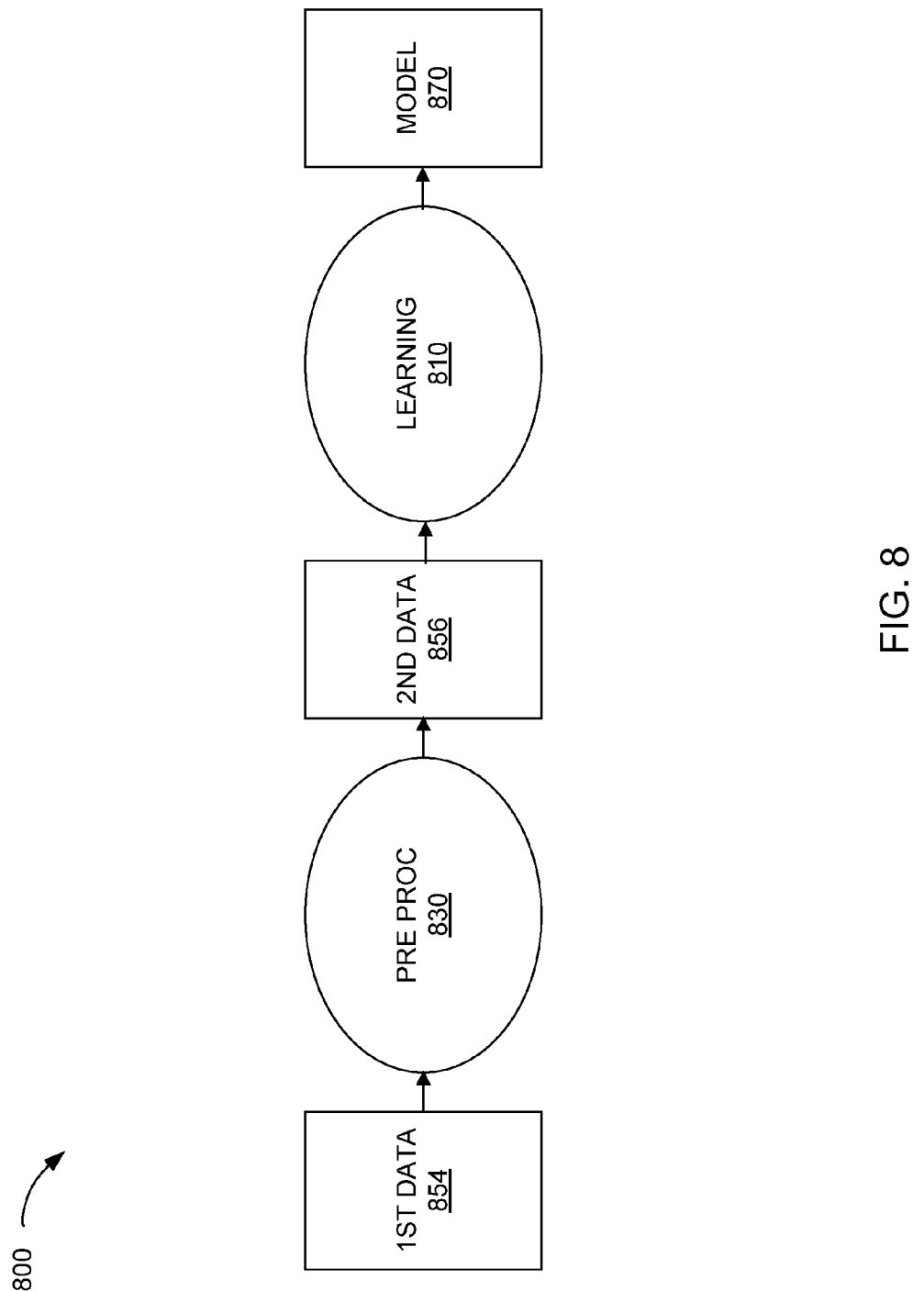
FIG. 8 is a block diagram of a portion of an electronic learning system of the electronic system in an embodiment of the invention.

Referring now to FIG. 8 therein is shown a block diagram of a portion of an electronic learning system 800 of the electronic system 100 in an embodiment of the invention. The electronic learning system 800 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 800 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 800 can provide machine learning including prediction, recommendation, filtering such as spam email filtering, machine learning processes, machine learning functions, or combination thereof. In some embodiments, prediction can include clicking or selecting an advertisement or advertiser, can recommend an item or items, can filter spam, can include like processes, or combination thereof, to provide machine learning such as for big data analytics.

For example, the electronic learning system 800 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 800 can include a learning block 810 such as a machine learning block for implementing or executing machine learning algorithms, big data machine learning, big data analytics, or combination thereof. The learning block 810 can implemented at least in part as hardware such as integrated circuits, integrated circuit cores, integrated circuit components, microelectromechanical system (MEMS), passive devices, or a combination thereof.

For example, the learning block 810 can provide machine learning, including parallel or distributed processing, cluster computing, or combination thereof. The learning block 810 can be implemented in system processors, in storage computing (ISC) processors, the first control unit 112, the second control unit 134, the first storage control unit 132, the second storage control unit 152, the first storage unit 114, the second storage unit 146, or combination thereof.

In an embodiment, the electronic learning system 800 can include a preprocessing block 830 such as scan and filter block for machine learning processes including scanning, filtering, selecting, partitioning, processing, receiving, transmitting, or combination thereof, in a manner similar to the select block 640 of FIG. 6, the scan and select block 730 of FIG. 7, or combination thereof. The preprocessing block 830 can intelligently select or partition data, such as training data, for providing significantly improved partial data. The significantly improved partial data can improve updating a model, vector, or combination thereof. The intelligent selection or partitioning can provide faster convergence with increased input and output (I/O). The preprocessing block 830 can be implemented at least in part as hardware such as integrated circuits, integrated circuit cores, integrated circuit components, microelectromechanical system (MEMS), passive devices, or a combination thereof.

In an embodiment, the preprocessing block 830 can process, scan, filter, select, partition, receive, transmit, or combination thereof, data including a first data block 854 such as training data, a second data block 856, or combination thereof. The second data block 856 can include intelligently selected data of the first data block 854, intelligently updated data of the first data block 854, partial data of the first data block 854, or combination thereof. The first data block 854, the second data block 856, or combination thereof, are implemented at least in part in hardware such as integrated circuits, integrated circuit cores, integrated circuit components, microelectromechanical system (MEMS), passive devices, the first storage unit 114, the second storage unit 146, the first storage media 126, the second storage media 142, or a combination thereof.

For example, the preprocessing block 830 can process, scan, filter, select, partition, receive, transmit, or combination thereof, a portion of or the entirety of the first data block 854 for providing the second data block 856. The first data block 854 can include raw data, training data, initial data, or combination thereof. The preprocessing block 830 can scan and filter a portion of or the entirety of the first data block 854 for providing a portion of or the entirety of the second data block 856, which can include filtered data, selected data, partitioned data, training data, partial data, partial training data, or combination thereof.

In an embodiment, the learning block 810 can process, scan, filter, select, partition, receive, transmit, or combination thereof, a portion of or the entirety of the second data block 856, for providing at least a portion of a model block 870, which can include a model parameter, vectors, an entire model, or combination thereof. The model 870 can be implemented at least in part in hardware such as integrated circuits, integrated circuit cores, integrated circuit components, microelectromechanical system (MEMS), passive devices, the first storage unit 114, the second storage unit 146, the first storage media 126, the second storage media 142, or a combination thereof.

In an embodiment, the model block 870 can include storage devices with machine learning data, analyzed big data, big data analytics, or combination thereof. The model block 870 can be implemented in storage devices, memory devices, system processors, storage computing (ISC) processors, the first storage unit 114, the second storage unit 146, the first control unit 112, the second control unit 134, the first storage control unit 132, the second storage control unit 152, or combination thereof.

For example, the first data block 854 can include storage devices with unprocessed or partially processed data. The first data block 854 can be implemented in storage devices, memory devices, the first storage unit 114, the second storage unit 146, the first storage media 126, the second storage media 142, or combination thereof. The second data block 856 can include storage devices with processed data such as the unprocessed data of the first data block 854 after processing. The second data block 856 can be implemented in storage devices, memory devices, the first storage unit 114, the second storage unit 146, the first storage media 126, the second storage media 142, or combination thereof.

For illustrative purposes, the learning block 810, the preprocessing block 830, the first data block 854, the second data block 856, the model block 870, or combination thereof, are shown as discrete blocks although it is understood that any of the blocks can share portions of the hardware with any of the other blocks. For example, the first data block 854, the second data block 856, the model block 870, or combination thereof, can share portions of hardware memory circuits or components such as the first storage unit 114, the second storage unit 146, the first storage media 126, the second storage media 142, or combination thereof.

Further for illustrative purposes, the learning block 810, the preprocessing block 830, the model block 870, or combination thereof, are shown as discrete blocks although it is understood that any number, combination, distribution, division, partitioning, or combination thereof, of the blocks may be included. For example, the learning block 810, the preprocessing block 830, the model block 870, or combination thereof, can each include multiple blocks distributed across multiple devices.

It has been discovered that the electronic learning system 800 with the learning block 810, the preprocessing block 830, the first data block 854, the second data block 856, the model block 870, or combination thereof, can provide machine learning, including parallel or distributed processing, cluster computing, or combination thereof. The electronic learning system 800 can implement the preprocessing block 830, the model block 870, or combination thereof, in a system processor, in storage computing (ISC), or combination thereof.

Figure 9:
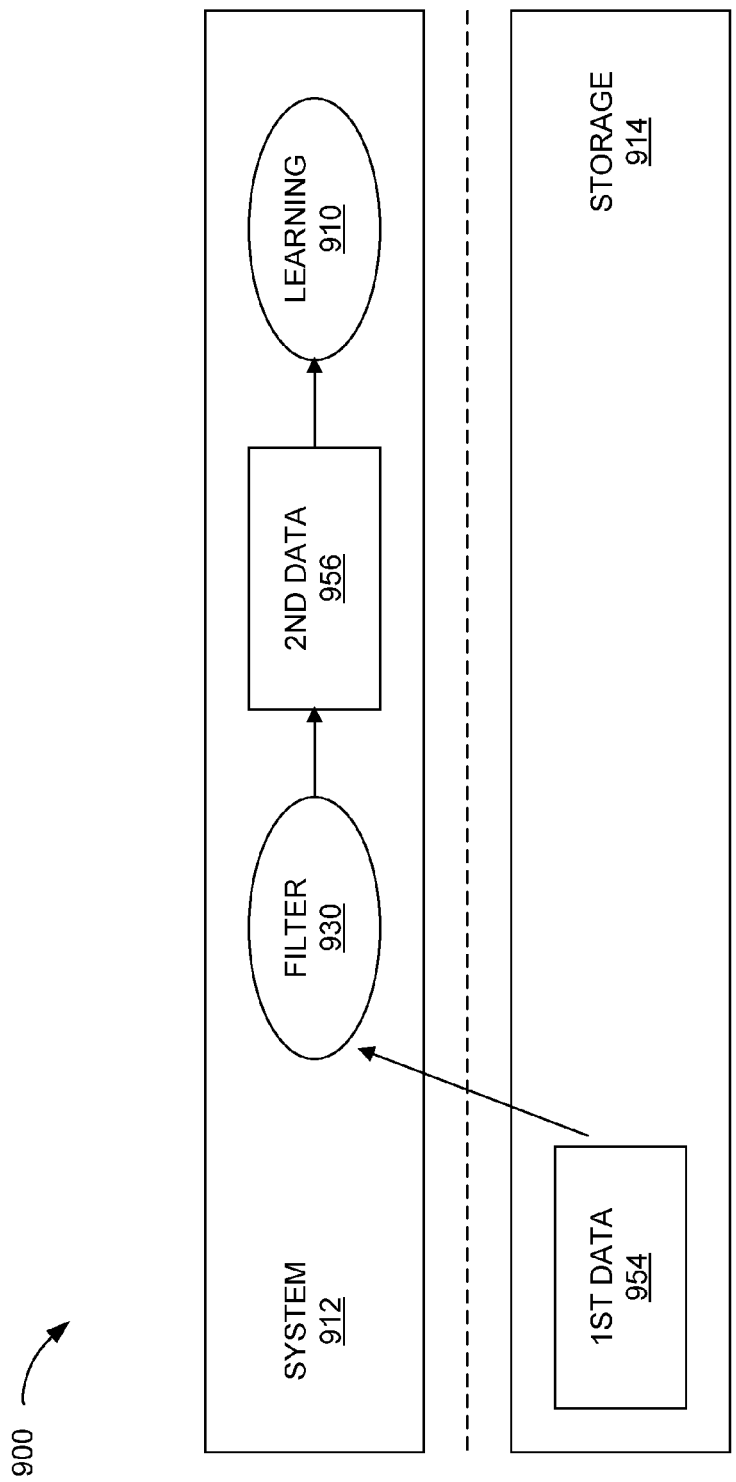
FIG. 9 is a block diagram of a portion of an electronic learning system of the electronic system in an embodiment of the invention.

Referring now to FIG. 9 therein is shown a block diagram of a portion of an electronic learning system 900 of the electronic system 100 in an embodiment of the invention. The electronic learning system 900 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 900 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 900 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

For illustrative purposes, the electronic learning system 900 is shown with a learning block 910 as part of a system device 912 although it is understood that a storage device 914 may also include other blocks including a learning block such as the learning block 910. The system device 912 can also include other blocks.

In an embodiment, the electronic learning system 900 can include a preprocessing block 930 such as a scan and filter block for scanning, filtering, selecting, partitioning, processing, receiving, transmitting, or combination thereof. The preprocessing block 930 can intelligently select or partition data, such as training data, for providing significantly improved partial data. The significantly improved partial data can improve updating a model, vector, or combination thereof. The intelligent selection or partitioning can provide faster convergence with increased input and output (I/O). The preprocessing block 930 can be implemented at least in part as hardware such as integrated circuits, integrated circuit cores, integrated circuit components, microelectromechanical system (MEMS), passive devices, or a combination thereof.

For example, the preprocessing block 930 can process data including a first data block 954 such as training data, a second data block 956, or combination thereof. The second data block 956 can include intelligently selected data of the first data block 954, intelligently updated data of the first data block 954, partial data of the first data block 954, or combination thereof. The preprocessing block 930 can process data received from the first data block 954 and provide data for the second data block 956. The first data block 954, the second data block 956, or combination thereof, are implemented at least in part in hardware such as integrated circuits, integrated circuit cores, integrated circuit components, microelectromechanical system (MEMS), passive devices, the first storage unit 114, the second storage unit 146, the first storage media 126, the second storage media 142, or a combination thereof.

In an embodiment, the learning block 910 can process, analyze, predict, recommend, filter, learn, receive, transmit, or combination thereof, data of the second data block 956. For example, the electronic learning system 900 can provide prediction, recommendation, filtering, machine learning processes, machine learning functions, or combination thereof. In some embodiments, prediction for example, can be based on clicking or selecting an advertisement or advertiser, can recommend an item or items, can filter spam, can include like processes, or combination thereof, to provide parallel or distributed machine learning such as for big data analytics.

It has been discovered that the electronic learning system 900 with the learning block 910, the preprocessing block 930, the first data block 954, the second data block 956, the system device 912, the storage device 914, or combination thereof, can provide machine learning, including parallel or distributed processing, cluster computing, or combination thereof. The preprocessing block 930, the model block 970, or combination thereof, can be implemented in the system device 912, the storage device 914, or combination thereof.

Figure 10:
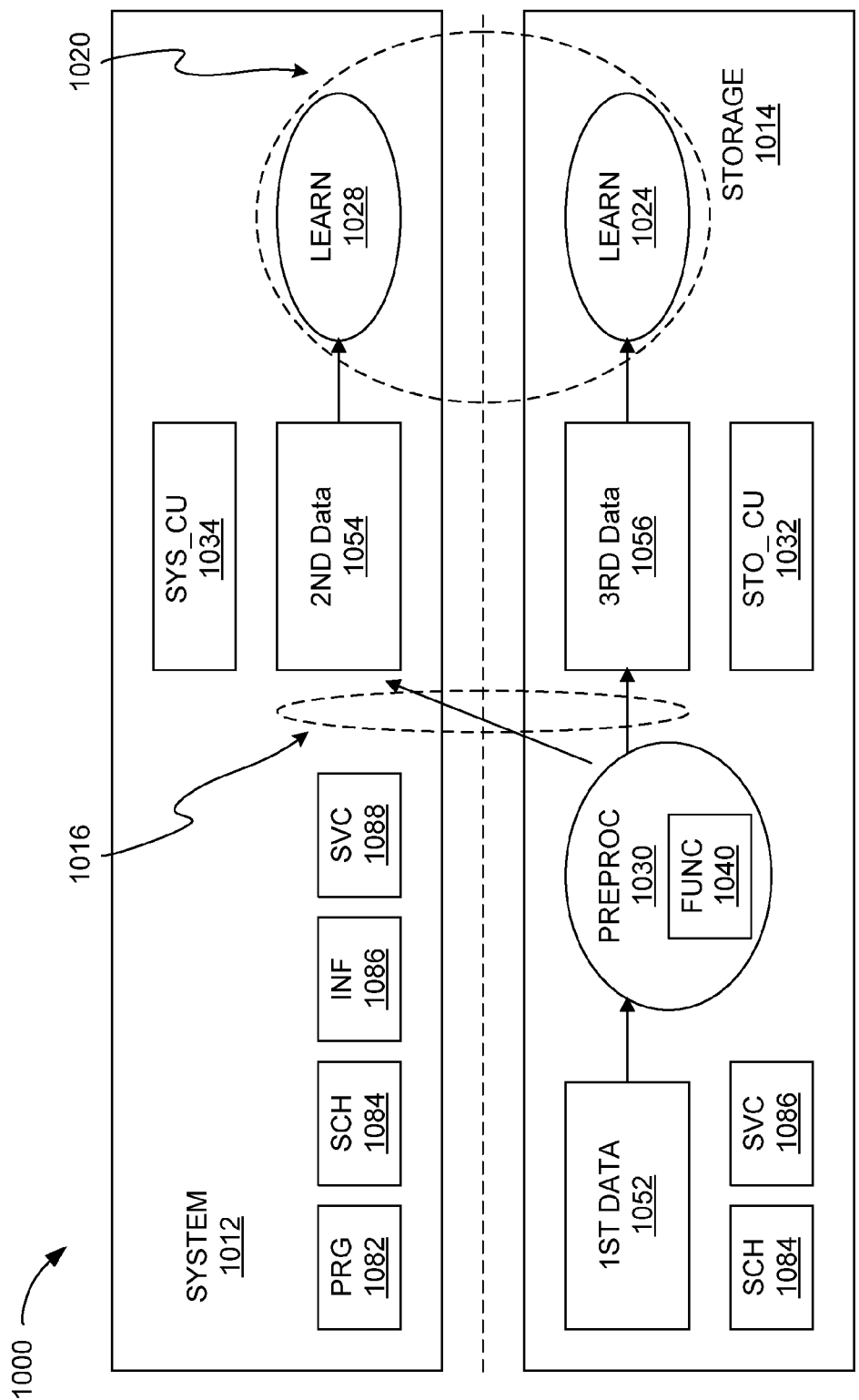
FIG. 10 is a block diagram of a portion of an electronic learning system of the electronic system in an embodiment of the invention.

Referring now to FIG. 10, therein is shown a block diagram of a portion of an electronic learning system 1000 of the electronic system 100 in an embodiment of the invention. The electronic learning system 1000 can be implemented with the first device 102 of FIG. 1, the second device 106 of FIG. 1, integrated circuits, integrated circuit cores, integrated circuit components, microelectromechanical system (MEMS), passive devices, or a combination thereof. For example, preprocessing can be executed by storage devices or system devices such as a system control unit or central processing unit (CPU) based on the electronic system 100 analyzing circumstances or conditions to determine allocation or assignment as further described below.

In an embodiment, the electronic learning system 1000 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 1000 can provide machine learning including prediction, recommendation, filtering, machine learning processes, machine learning functions, or combination thereof. In some embodiments, prediction, for example, can be based on clicking or selecting an advertisement or advertiser, can recommend an item or items, can filter spam, can include like processes, or combination thereof, to provide parallel or distributed machine learning such as for big data analytics.

For example, the electronic learning system 1000 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 1000 can include a system device 1012, a storage device 1014, an interface 1016, or combination thereof. The system device 1012 and the storage device 1014 can communicate with each other or within each device through the interface 1016. The system device 1012, the storage device 1014, and the interface 1016 can be implemented at least in part as hardware such as integrated circuits, integrated circuit cores, integrated circuit components, microelectromechanical system (MEMS), wiring, traces, passive devices, or a combination thereof.

In an embodiment, the electronic learning system 1000 can include learning blocks 1020 such as machine learning blocks for implementing or executing machine learning algorithms, big data machine learning, big data analytics, or combination thereof. The electronic learning system 1000 can include a storage learning block 1024, a system learning block 1028, or combination thereof. The storage learning block 1024, the system learning block 1028, or combination thereof, can be implemented at least in part as hardware such as integrated circuits, integrated circuit cores, integrated circuit components, microelectromechanical system (MEMS), passive devices, or a combination thereof.

For example, the storage learning block 1024, the system learning block 1028, or combination thereof, can provide machine learning, including parallel or distributed processing, cluster computing, or combination thereof. The storage learning block 1024, the system learning block 1028, or combination thereof, can be implemented in system processors, storage computing (ISC) processors, the first control unit 112, the second control unit 134, the first storage control unit 132, the second storage control unit 152, the first storage unit 114, the second storage unit 146, or combination thereof.

In an embodiment, the electronic learning system 1000 can include a preprocessing block 1030 such as scan and filter block for scanning, filtering, selecting, partitioning, processing, receiving, transmitting, or combination thereof. The preprocessing block 1030 can intelligently select or partition data, such as training data, for providing significantly improved partial data. The significantly improved partial data can improve updating a model, vector, or combination thereof. The intelligent selection or partitioning can provide faster convergence with increased input and output (I/O). The preprocessing block 1030 can implemented at least in part as hardware such as integrated circuits, integrated circuit cores, integrated circuit components, microelectromechanical system (MEMS), passive devices, or a combination thereof.

In an embodiment, the preprocessing block 1030 can also be implemented with a storage control unit 1032. The storage control unit 1032, in a manner similar to the first storage control unit 132 or the second storage control unit 152, can be a processor, an application specific integrated circuit (ASIC) an embedded processor, a microprocessor, a hardware control logic, a hardware finite state machine (FSM), a digital signal processor (DSP), or a combination thereof. Similarly, a system control unit 1034, in a manner similar to the second control unit 134 or the first control unit 112, can also be a processor, an application specific integrated circuit (ASIC) an embedded processor, a microprocessor, a hardware control logic, a hardware finite state machine (FSM), a digital signal processor (DSP), a field programmable gate array (FPGA), or a combination thereof.

In an embodiment, the preprocessing block 1030 of the storage device 1014 can offload a function 1040 such as scan, filter, learn, or combination thereof, from the system control unit 1034 to the storage control unit 1032. Similarly, a host can offload the function 1040 to the storage control unit 1032. The functions 1040 can include machine learning, big data processing, analyzing big data, big data analytics, or combination thereof. The function 1040, system device 1012, the storage device 1014, or combination thereof, can provide a scheduling algorithm for distributed machine learning with the storage device 1014 such as a smart solid-state storage device (SSD).

In an embodiment, the electronic learning system 1000 can include or define functions 1040 including offloadable machine learning components or functions. The offloadable machine learning components or functions can include main machine learning algorithms, filter, scan, any machine learning, or combination thereof. The electronic learning system 1000 can also divide, partition, select, or combination thereof, the offloadable machine learning components or functions. The offloadable machine learning components or functions can be divided, partitioned, selected, or combination thereof, for one or more iterations of machine learning. The electronic learning system 1000 can provide monitoring for dynamic scheduling.

For illustrative purposes, the electronic learning system 1000 is shown with the preprocessing block 1030 within the storage device 1014 although it is understood that the system device 1012 may also include functions or blocks for scan, filter, the preprocessing block 1030, or combination thereof. The storage device 1014, the system device 1012, or combination thereof may also include any number or type of blocks.

For example, the preprocessing block 1030 can process data, such as training data, selected data, or combination thereof, including a first data block 1052, a second data block 1054, a third data block 1056, or combination thereof. The preprocessing block 1030 can process, select, partition, or combination thereof, data received from the first data block 1052, such as a training data block, and provide data for the second data block 1054, the third data block 1056, or combination thereof. The second data block 1054, the third data block 1056, or combination thereof, can include an intelligently selected data block of the first data block 1052, an intelligently updated data block of the first data block 1052, a partial data block of the first data block 1052, or combination thereof.

In an embodiment, the first data block 1052, the second data block 1054, the third data block 1056, or combination thereof, can provide selected data for machine learning. The first data block 1052, the second data block 1054, the third data block 1056, or combination thereof, can be implemented at least in part in hardware such as integrated circuits, integrated circuit cores, integrated circuit components, microelectromechanical system (MEMS), passive devices, the first storage unit 114, the second storage unit 146, the first storage media 126, the second storage media 142, or a combination thereof.

In an embodiment, the storage learning block 1024 can process, analyze, predict, recommend, filter, learn, receive, transmit, or combination thereof, data of the third data block 1056. For example, the electronic learning system 1000 can provide prediction, recommendation, filtering, machine learning processes, machine learning functions, or combination thereof. In some embodiments, prediction, for example, can be based on clicking or selecting an advertisement or advertiser, can recommend an item or items, can filter spam, can include like processes, or combination thereof, to provide parallel or distributed machine learning such as for big data analytics.

In an embodiment, the system device 1012 of the electronic learning system 1000 can include a programming interface 1082, which can include an application programming interface (API), for machine learning including machine learning processes outside the system device 1012. For example, the programming interface 1082 can include programming languages, C, C++, scripting languages, Perl, Python, or combination thereof. The programming interface 1082 can apply to data, including big data, for all machine learning processes or algorithms including processing, scanning, filtering, analyzing, compressing, Karush-Kuhn-Tucker (KKT) filtering, Karush-Kuhn-Tucker (KKT) vector error filtering, random filtering, predicting, recommending, learning, or combination thereof.

In an embodiment, the system device 1012, the storage device 1014, or combination thereof, can identify issues including a bottleneck, resource saturation, pressure, limiting resource, or combination thereof. For example, the interface 1016 can include saturated input and output (I/O), which can provide reduced I/O for the electronic learning system 1000. The system device 1012, the storage device 1014, or combination thereof, can identify the saturated input and output (I/O) of the interface 1016 and intelligently offload, throttle, parallelize, distribute, or combination thereof, processing, including the functions 1040 to the storage control unit 1032, the system control unit 1034, or combination thereof.

In an embodiment, the system device 1012, the storage device 1014, or combination thereof, with the intelligent offloading, throttling, paralleling, distributing, or combination thereof, can alleviate issues including the bottleneck, resource saturation, pressure, limiting resource, or combination thereof. Alleviating issues can provide significantly higher throughput for the electronic learning system 1000, the electronic system 100, or combination thereof.

For example, the programming interface 1082 can include a "LEARN" command. The "LEARN" command can include information including metadata for executing the programming interface 1082 with the functions 1040 for parallel or distributed processing. The system device 1012, the storage device 1014, or combination thereof, can include a scheduler block 1084, which can include a high level programming language, for implementing the functions 1040, scheduling algorithms, assigning functions, assigning data, or combination thereof.

In an embodiment, the scheduler block 1084 can include an ad-hoc style per-node scheduler and access a control unit of the storage device 1014, such as the first storage control unit 132, the second storage control unit 152, or combination thereof, for selecting, partitioning, dividing, or combination thereof, machine learning with a control unit of the system device 1012, such as the first control unit 112, the second control unit 134, or combination thereof. The electronic learning system 1000 can provide SSD-runnable binaries for the preprocessing block 1030 for offloading scan and filter, a main iterative algorithm, or combination thereof, based on an I/O bottleneck, such as saturated I/O, to alleviate pressure.

For example, the preprocessing block 1030 can filter additional data including the first data 1052 based on determining a bottleneck such as the I/O bottleneck, the saturated I/O, or combination thereof. The preprocessing block 1030 can filter less data including the first data 1052 based on determining there is additional bandwidth including bandwidth in the interface 1016. The electronic learning system 1000 with the scheduler block 1084 can determine offloading at least a portion of the main iterative algorithm if a further I/O bottleneck is detected after offloading scan and filter. Data can be retrieved by the system device 1012, the storage device 1014, or combination thereof, randomly, regularly, or combination thereof, for determining I/O bottlenecks.

In an embodiment, the programming interface 1082, the scheduler block 1084, or combination thereof, can also include system calls such as new system calls, extended system calls, or combination thereof, for implementing the programming interface 1082, the functions 1040, or combination thereof. The programming interface 1082, the functions 1040, or combination thereof, can be implemented based on system information 1086. Further, the preprocessing block 1030 can intelligently select, partition, filter, or combination thereof, the first data 1052 based on the system information 1086.

In an embodiment, the system information 1086 can include system utilization, system bandwidth, system parameters, input and output (I/O) utilization, memory utilization, memory access, storage utilization, storage access, control unit utilization, control unit access, central processing unit (CPU) utilization, CPU access, memory processor utilization, memory processor access, or combination thereof. The system information 1086 can be implemented at least in part as hardware such as integrated circuits, integrated circuit cores, integrated circuit components, microelectromechanical system (MEMS), passive devices, the first storage media 126, the second storage media 142, or a combination thereof.

In an embodiment, the programming interface 1082, the functions 1040, the scheduler block 1084, or combination thereof, can also communicate with a service interface 1088, which can include a web service interface. For example, the service interface 1088 can provide communication with services external to the electronic learning system 1000, the electronic system 100, or combination thereof. The service interface 1088 can communicate with architectures for building client-server applications such as representational state transfer (REST), protocol specifications for exchanging data such as simple object access protocol (SOAP), services external to the electronic system 100, protocols external to the electronic system 100, architectures external to the electronic system 100, or combination thereof.

In an embodiment, the storage device 1014 can include Flash, solid-state drives (SSD), phase-change memory (PCM), spin-transfer torque random access memory (STT-RAM), resistive random access memory (ReRAM), magentoresistive random access memory (MRAM), any storage device, any memory device, or combination thereof. Storage devices 1014 and system devices 1012 can connect with the interface 1016 including memory bus, serial attached small computer system interface (SAS), serial attached advanced technology attachment (SATA), non-volatile memory express (NVMe), Fiber channel, Ethernet, remote direct memory access (RDMA), any interface, or combination thereof.

For illustrative purposes, the electronic learning system 1000 is shown with one of each of the components although it is understood that any number of the components may be included. For example, the electronic learning system 1000 can include more than one of the storage device 1014, the first data block 1052, the second data block 1054, the third data block 1056, any component, or combination thereof. Prediction, recommendation, filtering, machine learning processes, machine learning functions, or combination thereof, can provide machine learning such as for big data analytics. Similarly, the system learning block 1028, the storage learning block 1024, or combination thereof, can process, analyze, predict, recommend, filter, learn, receive, transmit, or combination thereof, data of the second data block 1054 for prediction, recommendation, filtering, machine learning processes, machine learning functions, or combination thereof.

It has been discovered that the electronic learning system 1000 of the electronic system 100 with system device 1012, the storage device 1014, can identify and alleviate issues with intelligent processing offload, throttling, paralleling, distribution, or combination thereof. The intelligent process offloading, throttling, paralleling, distributing, or combination thereof, can significantly improve performance by at least avoiding interface 1016 bottlenecks, resource saturation, pressure, or combination thereof, utilizing higher bandwidth in the storage device 1014 for the functions 1040.

Figure 11:
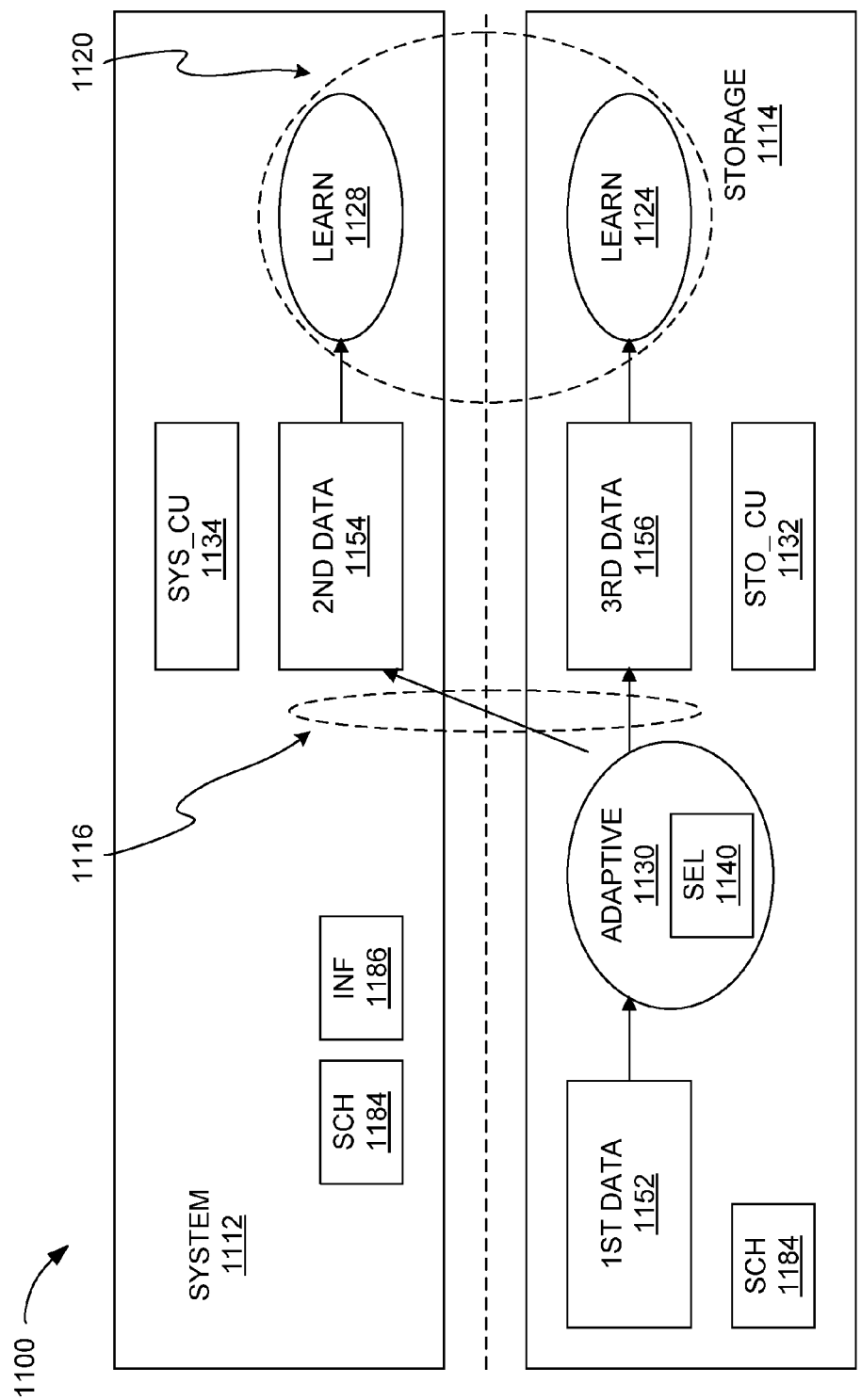
FIG. 11 is a block diagram of a portion of an electronic learning system of the electronic system in an embodiment of the invention.

Referring now to FIG. 11 therein is shown a block diagram of a portion of an electronic learning system 1100 of the electronic system 100 in an embodiment of the invention. The electronic learning system 1100 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 1100 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 1100 provide machine learning including prediction, recommendation, filtering, machine learning processes, machine learning functions, or combination thereof. In some embodiments, prediction, for example, can be based on clicking or selecting an advertisement or advertiser, can recommend an item or items, can filter spam, can include like processes, or combination thereof, to provide parallel or distributed machine learning such as for big data analytics.

For example, the electronic learning system 1100 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 1100 can include a system device 1112, a storage device 1114, an interface 1116, or combination thereof. The system device 1112 and the storage device 1114 can communicate with each other or within each device through the interface 1116. The system device 1112, the storage device 1114, and the interface 1116 can be implemented at least in part as hardware such as integrated circuits, integrated circuit cores, integrated circuit components, microelectromechanical system (MEMS), wiring, traces, passive devices, or a combination thereof.

In an embodiment, the electronic learning system 1100 can include learning blocks 1120 such as a machine learning block for implementing or executing machine learning algorithms, big data machine learning, big data analytics, or combination thereof. The electronic learning system 1100 can include a storage learning block 1124, a system learning block 1128, or combination thereof. The storage learning block 1124, the system learning block 1128, or combination thereof, can be implemented at least in part as hardware such as integrated circuits, integrated circuit cores, integrated circuit components, microelectromechanical system (MEMS), passive devices, or a combination thereof.

For example, the storage learning block 1124, the system learning block 1128, or combination thereof, can provide machine learning, including parallel or distributed processing, cluster computing, or combination thereof. The storage learning block 1124, the system learning block 1128, or combination thereof, can be implemented in system processors, in storage computing (ISC) processors, the first control unit 112, the second control unit 134, the first storage control unit 132, the second storage control unit 152, the first storage unit 114, the second storage unit 146, or combination thereof.

In an embodiment, the electronic learning system 1100 can include an adaptive block 1130 such as an adaptive preprocessing block, which can include a block for scanning, filtering, selecting, partitioning, processing, receiving, transmitting, or combination thereof. The adaptive block 1130, such as a scan and filter block, can be implemented at least in part as hardware such as integrated circuits, integrated circuit cores, integrated circuit components, microelectromechanical system (MEMS), passive devices, or a combination thereof. For example, the adaptive block 1130 as an adaptive preprocessing block can intelligently select or partition data, such as training data, based on dynamic system behavior monitoring for providing significantly improved partial data, which can improve updating a model, vector, or combination thereof, and can provide faster convergence with increased input and output (I/O).

In an embodiment, the adaptive block 1130 can also be implemented with a storage control unit 1132. The storage control unit 1132, in a manner similar to the first storage control unit 132 or the second storage control unit 152, can be a processor, an application specific integrated circuit (ASIC) an embedded processor, a microprocessor, a hardware control logic, a hardware finite state machine (FSM), a digital signal processor (DSP), a field programmable gate array (FPGA), or a combination thereof. Similarly, a system control unit 1134, in a manner similar to the second control unit 134 or the first control unit 112, can also be a processor, an application specific integrated circuit (ASIC) an embedded processor, a microprocessor, a hardware control logic, a hardware finite state machine (FSM), a digital signal processor (DSP), a field programmable gate array (FPGA), or a combination thereof.

In an embodiment, the adaptive block 1130 can include a selection block 1140, which can calculate an adaptive selection ratio, an adaptive learning ratio, the gradient 764 of FIG. 7, or combination thereof. The adaptive block 1130 of the storage device 1114 can offload functions including the functions 1040 of FIG. 10, such as scan, filter, select, partition, process, receive, transmit, learn, or combination thereof, from the system control unit 1134 to the storage control unit 1132, from the storage control unit 1132 to the system control unit 1134, or combination thereof. The functions can include machine learning, big data processing, analyzing big data, big data analytics, or combination thereof. For example, the adaptive block 1130 can determine system resource utilization and storage bandwidth for functions such as scan and select with the adaptive selection ratio, as well as system resource utilization and storage bandwidth for functions such as machine learning with the adaptive learning ratio. Based on the adaptive selection ratio, the learning ratio, or combination thereof, the adaptive block 1130 can control host computation and storage computation with an offload ratio.

In an embodiment, the adaptive block 1130, the system device 1112, the storage device 1114, or combination thereof, can provide scheduling for distributing machine learning with the system device 1112, the storage device 1114, or combination thereof. One or more of the storage device 1114, such as a smart solid-state storage device (SSD), can provide offloading machine learning, distributing machine learning, partitioning machine learning, or combination thereof.

In an embodiment, the electronic learning system 1100 can include or define functions including offloadable machine learning components or functions. The offloadable machine learning components or offloadable machine learning processes or machine learning functions can include main machine learning algorithms, filter, scan, preprocessing functions, any machine learning, or combination thereof. The electronic learning system 1100 can also divide, partition, select, offload, or combination thereof, the offloadable machine learning components or functions. The offloadable machine learning components or functions can be divided, partitioned, selected, or combination thereof, for one or more iterations of machine learning. The electronic learning system 1100 can provide monitoring for dynamic scheduling.

For illustrative purposes, the electronic learning system 1100 is shown with the adaptive block 1130 of the storage device 1114 although it is understood that the system device 1112 may also include an adaptive block 1130, a selection block such as the selection block 1140, functions, blocks for scan, blocks for filter, or combination thereof. The storage device 1114, the system device 1112, or combination thereof may also include any number or type of blocks.

In an embodiment, the adaptive block 1130 can process, select, partition, or combination thereof, data, such as training data, selected data, or combination thereof, including a first data block 1152, a second data block 1154, a third data block 1156, or combination thereof. The adaptive block 1130 can process data received from the first data block 1152, such as a training data block, and provide data for the second data block 1154, such as a selected system data block, the third data block 1156, such as a selected storage data block, or combination thereof. The second data block 1154, the third data block 1156, or combination thereof, can include an intelligently selected data block of the first data block 1152, an intelligently updated data block of the first data block 1152, a partial data block of the first data block 1152, or combination thereof.

The first data block 1152, the second data block 1154, the third data block 1156, or combination thereof, can provide selected data for parallel or distributed machine learning. The first data block 1152, the second data block 1154, the third data block 1156, or combination thereof, can be implemented at least in part in hardware such as integrated circuits, integrated circuit cores, integrated circuit components, microelectromechanical system (MEMS), passive devices, the first storage unit 114, the second storage unit 146, the first storage media 126, the second storage media 142, or a combination thereof.

In an embodiment, the storage learning block 1124 can process, analyze, predict, recommend, filter, learn, receive, transmit, or combination thereof, data of the third data block 1156. For example, the electronic learning system 1100 can provide prediction, recommendation, filtering, machine learning processes, machine learning functions, or combination thereof, based on clicking or selecting an advertisement or advertiser, recommending an item or items, filtering spam, or combination thereof. In some embodiments, prediction can be based on clicking or selecting an advertisement or advertiser, can recommend an item or items, can filter spam, can include like processes, or combination thereof, to provide parallel or distributed machine learning such as for big data analytics. Similarly, the system learning block 1128 can process, analyze, predict, recommend, filter, learn, receive, transmit, or combination thereof, data of the second data block 1154 for prediction, recommendation, filtering, machine learning processes, machine learning functions, or combination thereof.

In an embodiment, the system device 1112 of the electronic learning system 1100 can include a programming interface, such as the programming interface 1082 of FIG. 10, for parallel or distributed machine learning including machine learning processes outside the system device 1112. The commands can apply to data, including big data, for all machine learning processes or algorithms including processing, scanning, filtering, analyzing, compressing, Karush-Kuhn-Tucker (KKT) filtering, Karush-Kuhn-Tucker (KKT) vector error filtering, random filtering, predicting, recommending, learning, or combination thereof.

In an embodiment, the system device 1112, the storage device 1114, or combination thereof, can identify issues including a bottleneck, resource saturation, pressure, limiting resource, or combination thereof. For example, the interface 1116 can include saturated input and output (I/O), which can provide reduced I/O for the electronic learning system 1100. The system device 1112, the storage device 1114, or combination thereof, can identify the saturated input and output (I/O) of the interface 1116 and intelligently offload, throttle, parallelize, distribute, or combination thereof, processing, including functions, such as the functions 1040 of FIG. 10, on the storage control unit 1132, the system control unit 1134, or combination thereof.

In an embodiment, the adaptive block 1130, the system device 1112, the storage device 1114, or combination thereof, with the intelligent offloading, throttling, paralleling, distributing, or combination thereof, can alleviate issues including the bottleneck, resource saturation, pressure, limiting resource, or combination thereof. Alleviating issues can provide significantly higher throughput for the electronic learning system 1100, the electronic system 110, or combination thereof.

In an embodiment, the system device 1112, the storage device 1114, or combination thereof, can include a scheduler block 1184, which can include a high level programming language, for implementing the functions, scheduling algorithms, assigning functions, assigning data, or combination thereof. A scheduler block 1184 can include an ad-hoc style per-node scheduler and access a control unit of the storage device 1114, such as the first storage control unit 132, the second storage control unit 152, or combination thereof, for selecting, partitioning, dividing, or combination thereof, parallel or distributed machine learning with a control unit of the system device 1112, such as the first control unit 112, the second control unit 134, or combination thereof. The electronic learning system 1100 can provide SSD-runnable binaries for the adaptive block 1130 for offloading scan and filter, a main iterative algorithm, or combination thereof, based on an I/O bottleneck, such as saturated I/O, to alleviate pressure.

For example, the adaptive block 1130 can filter additional data including the first data 1152 based on determining a bottleneck such as an I/O bottleneck, saturated I/O, or combination thereof. The adaptive block 1130 can filter less data including the first data 1152 based on determining there is additional bandwidth including bandwidth in the interface 1116. The electronic learning system 1100 with the scheduler block 1184 can determine offloading at least a portion of the main iterative algorithm if a further I/O bottleneck is detected after offloading scan and filter. Data can be retrieved by the system device 1112, the storage device 1114, or combination thereof, randomly, regularly, or combination thereof, for determining I/O bottlenecks.

In an embodiment in a manner similar to the electronic learning system 1000, the system device 1112, the storage device 1114, or combination thereof, can also include a programming interface, such as the scheduler block 1084 of FIG. 10 that can include a high level programming language, for implementing the commands, the functions, scheduling algorithms, assigning functions, assigning data, or combination thereof.

In an embodiment, the commands, the programming interface, or combination thereof, can include system calls such as new system calls, extended system calls, system status, system status of input and output bandwidth, system-status of computational utilization, system status of throttling, or combination thereof, for implementing the commands, the functions, or combination thereof. The commands, the programming interface, or combination thereof, can be based on system information 1186. Further, the adaptive block 1130 can intelligently select, partition, or combination thereof, the first data 1152 based on the system information 1186.

In an embodiment, the system information 1186 can include system utilization, system bandwidth, system parameters, input and output (I/O) utilization, memory utilization, memory access, storage utilization, storage access, control unit utilization, control unit access, central processing unit (CPU) utilization, CPU access, memory processor utilization, memory processor access, or combination thereof. The system information 1186 can be implemented at least in part as hardware such as integrated circuits, integrated circuit cores, integrated circuit components, microelectromechanical system (MEMS), passive devices, the first storage media 126, the second storage media 142, or a combination thereof.

In an embodiment, the system device 1112, the storage device 1114, or combination thereof, can also communicate with a service interface, such as the service interface 1088 of FIG. 10, which can include a web service interface. The service interface can provide communication with services external to the electronic learning system 1100, the electronic system 110, or combination thereof.

In an embodiment, the storage device 1114 can include Flash, solid-state drives (SSD), phase-change memory (PCM), spin-transfer torque random access memory (STT-RAM), resistive random access memory (ReRAM), magentoresistive random access memory (MRAM), any storage device, any memory device, or combination thereof. Storage devices 1114 and system devices 1112 can connect with the interface 1116 including memory bus, serial attached small computer system interface (SAS), serial attached advanced technology attachment (SATA), non-volatile memory express (NVMe), Fiber channel, Ethernet, remote direct memory access (RDMA), any interface, or combination thereof.

For illustrative purposes, the electronic learning system 1100 is shown with one of each of the components although it is understood that any number of the components may be included. For example, the electronic learning system 1100 can include more than one of the storage device 1114, the first data block 1152, the second data block 1154, the third data block 1156, any component, or combination thereof.

It has been discovered that the electronic learning system 1100 with the adaptive block 1130, the storage learning block 1124, the system learning block 1128, or combination thereof, can identify and alleviate issues with intelligent processing offload, throttling, paralleling, distribution, or combination thereof. The intelligent process offloading, throttling, paralleling, distributing, or combination thereof, can significantly improve performance by at least avoiding interface 1116 bottlenecks, resource saturation, pressure or combination thereof, utilizing higher bandwidth in the system device 1112, the storage device 1114, or combination thereof.

Figure 12:
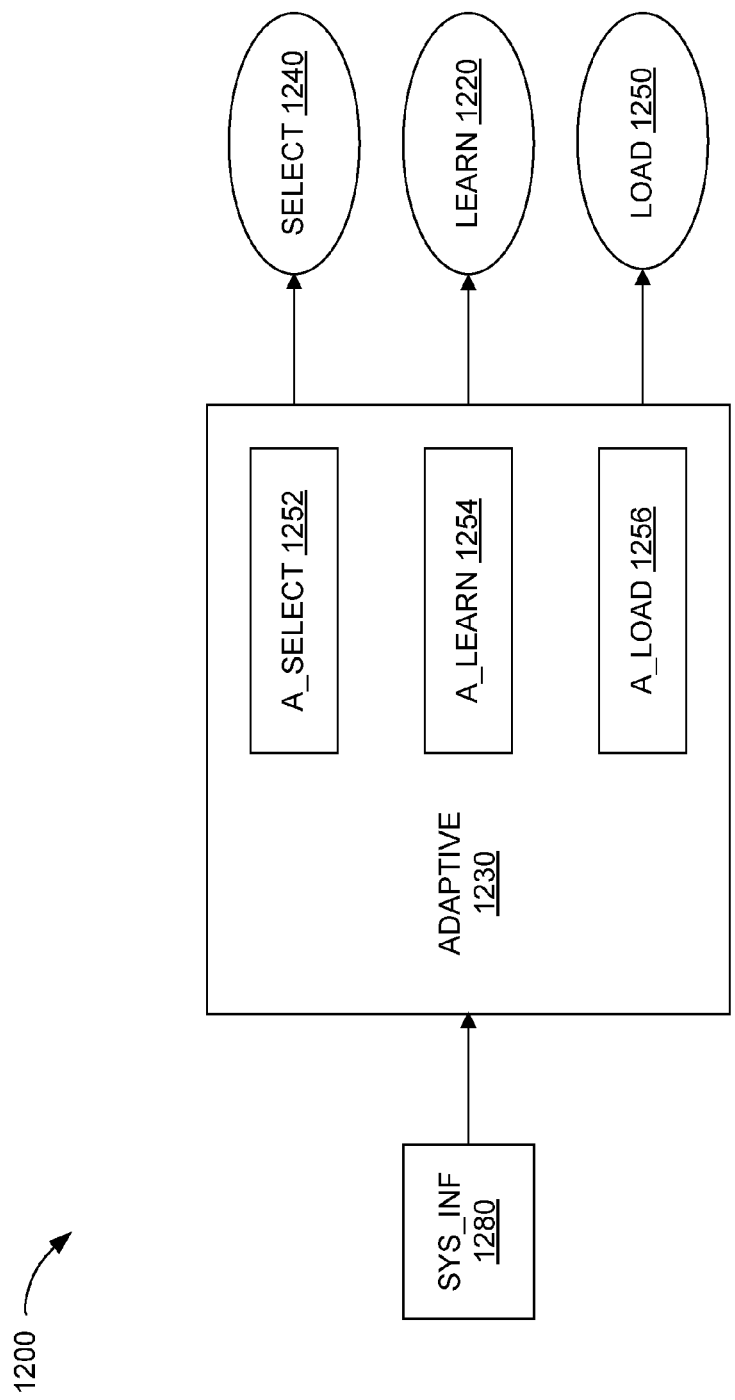
FIG. 12 is a block diagram of a portion of an electronic learning system of the electronic system in an embodiment of the invention.

Referring now to FIG. 12, therein is shown a block diagram of a portion of an electronic learning system 1200 of the electronic system 100 in an embodiment of the invention. The electronic learning system 1200 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 1200 can control, place, or combination thereof, machine learning algorithms and can be included in the adaptive block 1130 of FIG. 11 or the preprocessing block 1030 of FIG. 10. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 1200 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 1200 can include adaptive processes for parallel or distributed machine learning such as scanning, filtering, predicting, recommending, machine learning processes, machine learning functions, big data analytics, or combination thereof. The adaptive processes can include control parameters, selection ratios, learning ratios, host computation to storage computation ratios, or combination thereof, for parallel or distributed machine learning and hardware control including system, in storage computing (ISC), solid-state storage device (SSD), or combination thereof.

For example, the electronic learning system 1200 can intelligently select or partition data, such as training data, for providing significantly improved partial data. The significantly improved partial data can improve updating a model, vector, or combination thereof. The intelligent selection or partitioning can provide faster convergence with increased input and output (I/O).

In an embodiment, the electronic learning system 1200 can include a learning block 1220 such as a machine learning block, an adaptive block 1230 such as an adaptive mechanism block, a load block 1250 such as an offload block, in storage computing (ISC), or combination thereof. The learning block 1220, the adaptive block 1230, the load block 1250, or combination thereof, can be implemented at least in part as hardware such as integrated circuits, integrated circuit cores, integrated circuit components, microelectromechanical system (MEMS), passive devices, or a combination thereof. For example, the learning block 1220 can provide learning rates that can be input into machine learning algorithms, machine learning blocks, the learning blocks 1120 of FIG. 11, the learning blocks 1020 of FIG. 10, the learning block 910 of FIG. 9, the learning block 810 of FIG. 8, the learning block 210 of FIG. 2, or combination thereof.

In an embodiment, the adaptive block 1230 can process, calculate, determine, or combination thereof, an adaptive select parameter 1252, an adaptive learn parameter 1254, an adaptive load parameter 1256, or combination thereof. The adaptive select parameter 1252, an adaptive learn parameter 1254, an adaptive load parameter 1256, or combination thereof, can be implemented at least in part in hardware such as integrated circuits, integrated circuit cores, integrated circuit components, microelectromechanical system (MEMS), passive devices, or a combination thereof. For example, the adaptive block 1230 as an adaptive preprocessing block can intelligently process, calculate, determine, or combination thereof, parameters for partitioning data based on dynamic system behavior monitoring.

For example, the learning block 1220, the adaptive block 1230, the load block 1250, or combination thereof, can be implemented at least in part with the first control unit 112, the second control unit 134, the first storage control unit 132, the second storage control unit 152, or combination thereof. The adaptive select parameter 1252, the adaptive learn parameter 1254, the adaptive load parameter 1256, or combination thereof, can be implemented at least in part with the first storage unit 114, the second storage unit 146, the first storage media 126, the second storage media 142, or combination thereof.

In an embodiment, the adaptive block 1230 can process software control parameters including the adaptive select parameter 1252, the adaptive learn parameter 1254, or combination thereof, for a parallel or distributed machine learning process including a machine learning algorithm of the learn block 1220, the preprocessing block 1240, or combination thereof. The software control, such as the adaptive select parameter 1252, the adaptive learn parameter 1254, or combination thereof, can include control parameters of the machine learning algorithm, selection ratios, learning ratios, or combination thereof. For example, the preprocessing block 1240 can provide preprocessing functions such as scan, select, any machine learning processes, any machine learning function, or combination thereof, and can be based on a selection ratio.

In an embodiment, the adaptive block 1230 can process hardware control parameters including the adaptive load parameter 1256 for an offloading process of the load block 1250, which can include offloading machine learning with parallel processing for in storage computing (ISC), smart solid-state storage device (SSD), or combination thereof. The hardware control, such as the adaptive load parameter 1256, can control ratios of host computation to storage computation, offloading ratios, or combination thereof.

In an embodiment, the adaptive select parameter 1252, the adaptive learn parameter 1254, the adaptive load parameter 1256, or combination thereof, can include a select ratio, a learn ratio, a load ratio, respectively, computed by the adaptive block 1230 based on system information 1280 including system utilization, system bandwidth, system parameters, input and output (I/O) utilization, memory utilization, memory access, storage utilization, storage access, control unit utilization, control unit access, central processing unit (CPU) utilization, CPU access, storage processor utilization, storage processor access, or combination thereof. The system information 1280 can be implemented in hardware such as integrated circuits, integrated circuit cores, integrated circuit components, microelectromechanical system (MEMS), passive devices, the first storage unit 114, the second storage unit 146, the first storage media 126, the second storage media 142, or a combination thereof.

For illustrative purposes, the electronic learning system 1200 is shown with one each of the adaptive block 1230, the adaptive select parameter 1252, the adaptive learn parameter 1254, the adaptive load parameter 1256, or combination thereof, although it is understood that the electronic learning system 1200 can include any number of the blocks such as the adaptive block 1230, the adaptive select parameter 1252, the adaptive learn parameter 1254, the adaptive load parameter 1256, or combination thereof.

It has been discovered that the electronic learning system 1200 with the system information 1280 provides parallel or distributed machine learning, including cluster computing, for parallel processing in system processors as well as in storage computing (ISC) processors for faster convergence with increased input and output (I/O) based on the adaptive block 1230 including the adaptive select parameter 1252, the adaptive learn parameter 1254, the adaptive load parameter 1256, or combination thereof. The adaptive block 1230 using system information 1280 can intelligently select or partition data, such as training data, for providing significantly improved partial data.

Figure 13:
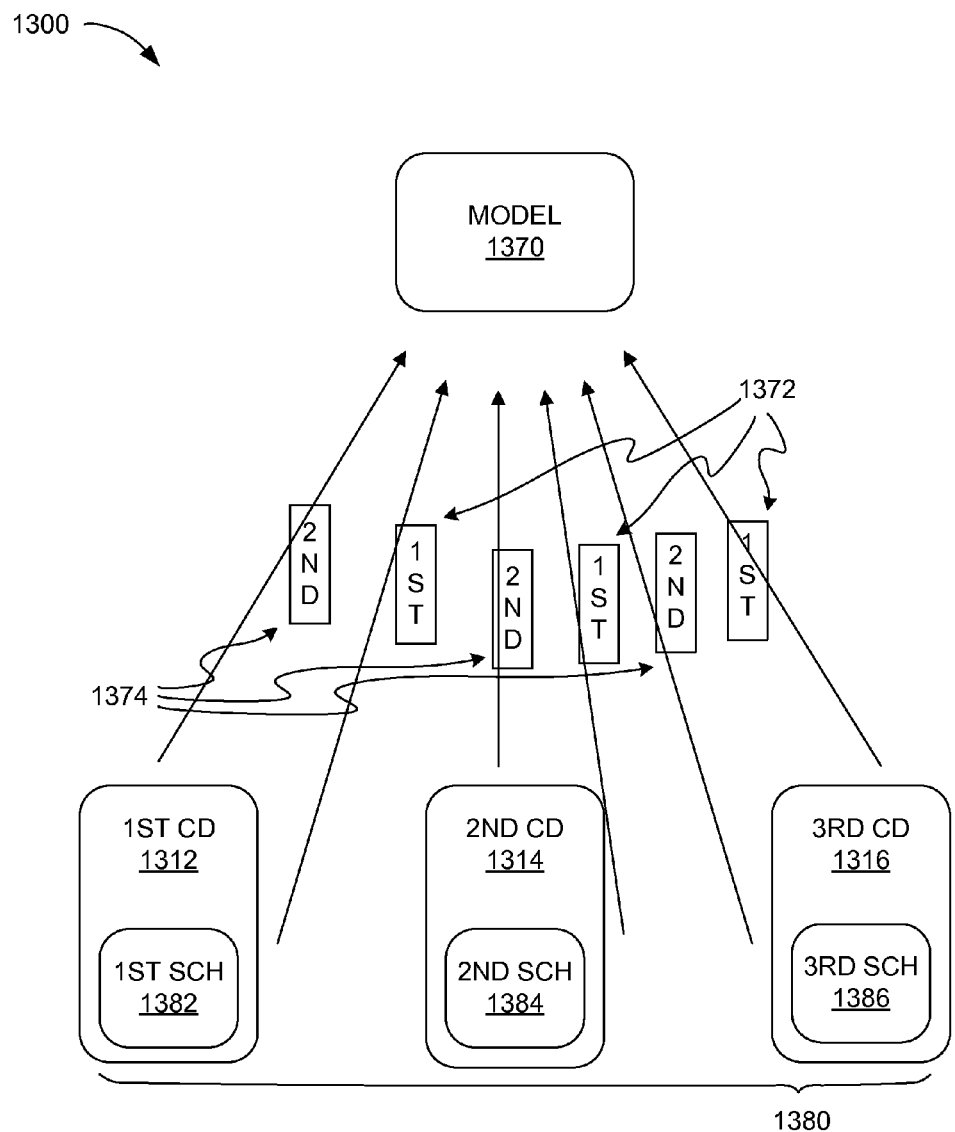
FIG. 13 is a block diagram of a portion of an electronic learning system of the electronic system in an embodiment of the invention.

Referring now to FIG. 13, therein is shown a block diagram of a portion of an electronic learning system 1300 of the electronic system 100 in an embodiment of the invention. The electronic learning system 1300 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 1300 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 1300 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 1300 can include adaptive processes for machine learning such as scanning, filtering, predicting, recommending, machine learning processes, machine learning functions, big data analytics, or combination thereof. The adaptive processes can include control parameters, selection ratios, learning ratios, host computation to storage computation ratios, or combination thereof, for parallel or distributed machine learning and hardware control including system, in storage computing (ISC), solid-state storage device (SSD), or combination thereof.

For example, the electronic learning system 1300 can intelligently select or partition data, such as training data, for providing significantly improved partial data. The significantly improved partial data can improve updating a model, vector, or combination thereof. The intelligent selection or partitioning can provide faster convergence with increased input and output (I/O).

In an embodiment, the electronic learning system 1300 can include a first compute device 1312, a second compute device 1314, a third compute device 1316, or combination thereof. The first compute device 1312, the second compute device 1314, the third compute device 1316, or combination thereof, can be implemented as a system device or a storage device such as the system device 512 of FIG. 5, the storage device 514 of FIG. 5, the system device 912 of FIG. 9, the storage device 914 of FIG. 9, the system device 1012 of FIG. 10, the storage device 1014 of FIG. 10, the system device 1112 of FIG. 11, the storage device 1114 of FIG. 11, the first device 102, the second device 106, any compute device, or combination thereof. For illustrative purposes, the electronic learning system 1300 is shown with three compute devices although it is understood that any number and type of compute devices may be included.

In an embodiment, the electronic learning system 1300 can include a model device 1370 such as model server. The model device can be implemented as a system device, a storage device, or combination thereof. The model device 1370 can include but does not require computing resources.

The model device 1370 can include machine learning data, vectors, parameters, models, or combination thereof, based on machine learning data, big data machine learning, analyzed big data, big data analytics, or combination thereof.

For illustrative purposes, the first compute device 1312, the second compute device 1314, the third compute device 1316, the model server 1370, or combination thereof, are shown as discrete blocks although it is understood that any of the blocks can share portions of the hardware with any of the other blocks. For example, the first compute device 1312, the second compute device 1314, the third compute device 1316, the model server, or combination thereof, can share portions of hardware circuits or components.

The electronic learning system 1300 can include at least a vector of a first model 1372 such as a storage device computed model. The electronic learning system 1300 can also include at least a vector of a second model 1374 such as a host device or system device computed model. The electronic learning system 1300 can provide at least a vector of new or updated models for the first model 1372, the second model 1374, or combination thereof. The first model 1372, the second model 1374, or combination thereof, can be provided, stored, updated, amended, written, recorded, entered, revised, replaced, or combination thereof, on the model device 1370.

For illustrative purposes, the first model 1372 is shown as a storage device computed model although it is understood that the first model 1372 can be computed with any device. Similarly, for illustrative purposes, the second model 1374, is shown as a host or system computed model although it is understood that the second model 1374 can be computed with any device.

A scheduler 1380 can intelligently assign data, tasks, functions, operations, or combination thereof, for the first compute device 1312, the second compute device 1314, the third compute device 1316, the model server 1370, or combination thereof. The intelligent selection or partitioning of data, such as training data, can provide significantly improved partial data. The significantly improved partial data can improve updating a model, vector, or combination thereof. The intelligent selection or partitioning can provide faster convergence with increased input and output (I/O).

The scheduler 1380 can include a first scheduler block 1382, a second scheduler block 1384, a third scheduler block 1386, or combination thereof, and can include a high level programming language, for implementing functions such as the function 1040 of FIG. 10, scheduling algorithms, assigning functions, assigning data, or combination thereof. The first scheduler block 1382, the second scheduler block 1384, the third scheduler block 1386, or combination thereof, can include an ad-hoc style per-node scheduler and access control units of the first compute device 1312, the second compute device 1314, the third compute device 1316, or combination thereof, for selecting, partitioning, dividing, machine learning, or combination thereof.

For illustrative purposes, the scheduler 1380 is shown with three blocks, such as the first scheduler block 1382, the second scheduler block 1384, the third scheduler block 1386, or combination thereof, although it is understood that the scheduler 1380 may include any number of blocks. The scheduler 1380 can also function as a single block with multiple sub blocks such as the first scheduler block 1382, the second scheduler block 1384, the third scheduler block 1386, or combination thereof.

It has been discovered that the electronic learning system 1300 with the scheduler 1380 can intelligently select, partition, divide, or combination thereof, parallel or distributed machine learning including big data analytics. The scheduler 1380 can intelligently offload, select, partition, divide, or combination thereof, data, processes, analyses, functions, learning, or combination thereof, for providing first models 1372 and second models 1374 with the first compute device 1312, the second compute device 1314, the third compute device 1316, or combination thereof.

Figure 14:
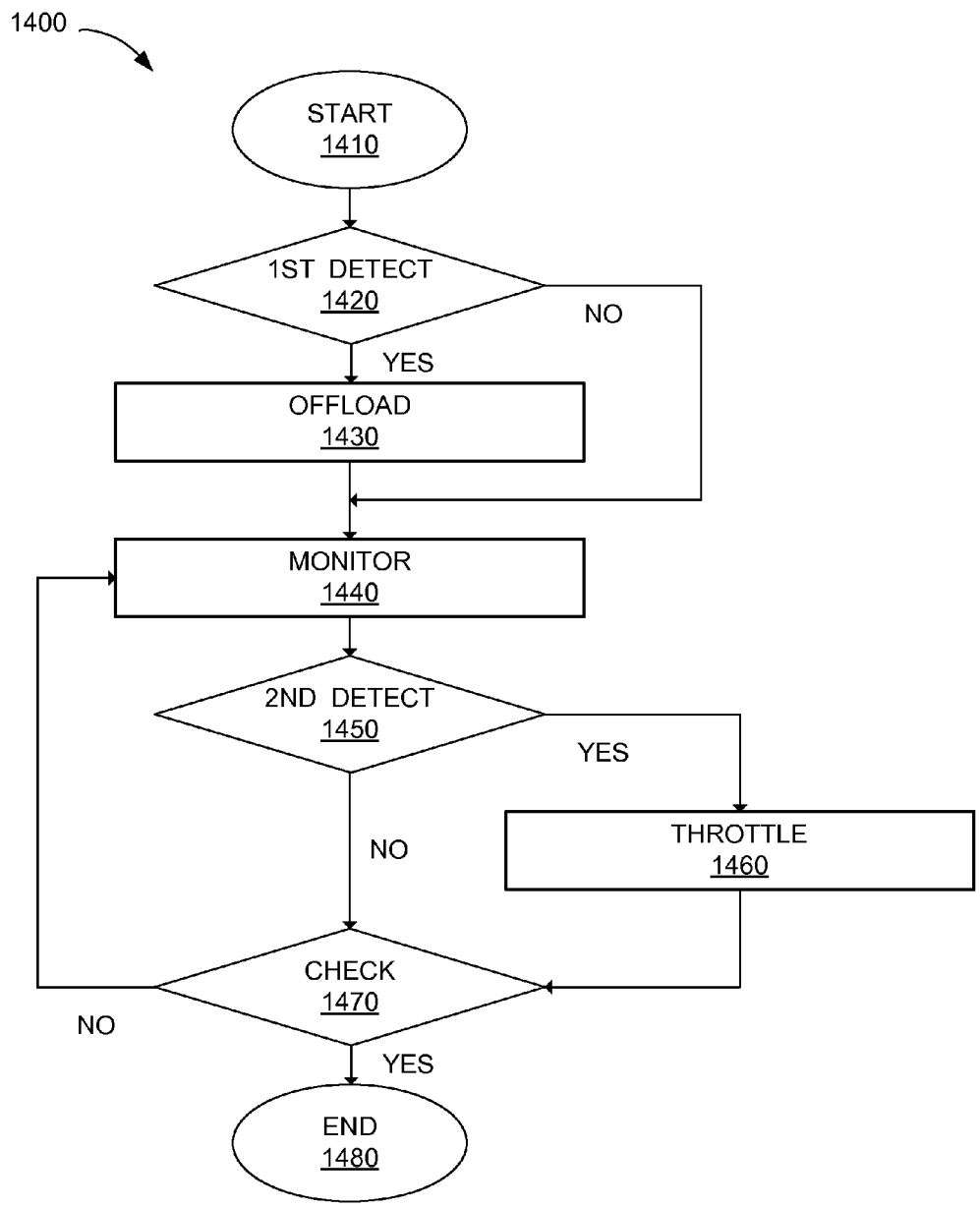
FIG. 14 is a process flow of an electronic learning system of the electronic system in an embodiment of the invention.

Referring now to FIG. 14, therein is shown a process flow of an electronic learning system 1400 of the electronic system 100 in an embodiment of the invention. The electronic learning system 1400 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 1400 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 1400 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 1400 can include adaptive processes for parallel or distributed machine learning such as scanning, filtering, predicting, recommending, machine learning processes, machine learning functions, big data analytics, or combination thereof. The adaptive processes can include control parameters, selection ratios, learning ratios, host computation to storage computation ratios, or combination thereof, for parallel or distributed machine learning and hardware control including system, in storage computing (ISC), solid-state storage device (SSD), or combination thereof.

For example, the electronic learning system 1400 can intelligently select or partition data, such as training data, for providing significantly improved partial data. The significantly improved partial data can improve updating a model, vector, or combination thereof. The intelligent selection or partitioning can provide faster convergence with increased input and output (I/O).

In an embodiment, the electronic learning system 1400 can include a start of process 1410, a first detect process 1420, an offload process 1430, a monitor process 1440, a second detect process 1450, a throttle process 1460, a check process 1470, an end of process 1480, or combination thereof. The process flow of the electronic learning system 1400 can include iterations of each process based on continued bottlenecks. For illustrative purposes, two detect processes are shown although it is understood that any number of detect process may be included. Further for illustrative purposes, one each of the other processes is shown although it is understood that any number or type of process may be included.

In an embodiment, the first detect process 1420 can detect issues such as bottlenecks, resource saturation, pressure, limited resources, or combination thereof, with the electronic system 100. For example, the first detect process 1420 can detect input and output issues with a system or host device and a storage device. Based on detecting an issue, the first detect process 1420 can continue with, direct to, cancel, or invoke the offload process 1430. Based on not detecting an issue, the first detect process 1420 can continue with, direct to, cancel, or invoke the monitor process 1440.

In an embodiment, the offload process 1430 can provide intelligent processing including selected processing, partitioned processing, parallel processing, distributed processing, or combination thereof. The offload process 1430 can select, partition, parallelize, distribute, or combination thereof, machine learning including data, tasks, processes, functions, big data, analytics, or combination thereof. For example, the offload process 1430 can distribute data and processes for in storage computing (ISC) from a host or system. The offload process 1430 can continue with, direct to, or invoke the monitor process 1440.

In an embodiment, the monitor process 1440 can provide detecting, identifying, monitoring, measuring, checking, or combination thereof, of the detected issues of the first detect process 1420, such as bottlenecks, resource saturation, pressure, limited resources, or combination thereof. The monitor process 1440 can continue with, direct to, or invoke the second detect process 1450.

In an embodiment, the second detect process 1450 can detect issues such as bottlenecks, resource saturation, pressure, limited resources, or combination thereof, with the electronic system 100. For example, the second detect process 1450 can detect input and output issues with a system or host device and a storage device. Based on detecting an issue, the second detect process 1450 can continue with, direct to, or invoke the throttle process 1460. Based on not detecting an issue, the second detect process 1450 can continue with, direct to, or invoke the check process 1470.

In an embodiment, the throttle process 1460 can provide intelligent processing including selected processing, partitioned processing, parallel processing, distributed processing, or combination thereof. The throttle process 1460 can select, partition, parallel, distribute, or combination thereof, machine learning including data, tasks, processes, functions, big data, analytics, or combination thereof. For example, the throttle process 1460 can distribute data and processes for in storage computing (ISC) from a host or system. The throttle process 1460 can continue with, direct to, or invoke the check process 1470.

In an embodiment, the check process 1470 can determine resolution, completion, end, or combination thereof, of an issue such as bottlenecks, resource saturation, pressure, limited resources, or combination thereof, with the electronic system 100. Based on determining that the issue with the electronic system 100 is resolved, the check process 1470 can continue with, direct to, or invoke the end of process 1480. Based on determining that the issue with the electronic system 100 is unresolved, the check process 1470 can continue with, direct to, or invoke the monitor process 1440.

It has been discovered that the process flow of the electronic learning system 1400 including the first detect process 1420, the offload process 1430, the monitor process 1440, the second detect process 1450, the throttle process 1460, the check process 1470, or combination thereof, can include iterations until bottlenecks are resolved. The first detect process 1420, the second detect process 1450, the check process 1470, or combination thereof, can iterate based on continued detection of unresolved bottlenecks.

Figure 15:
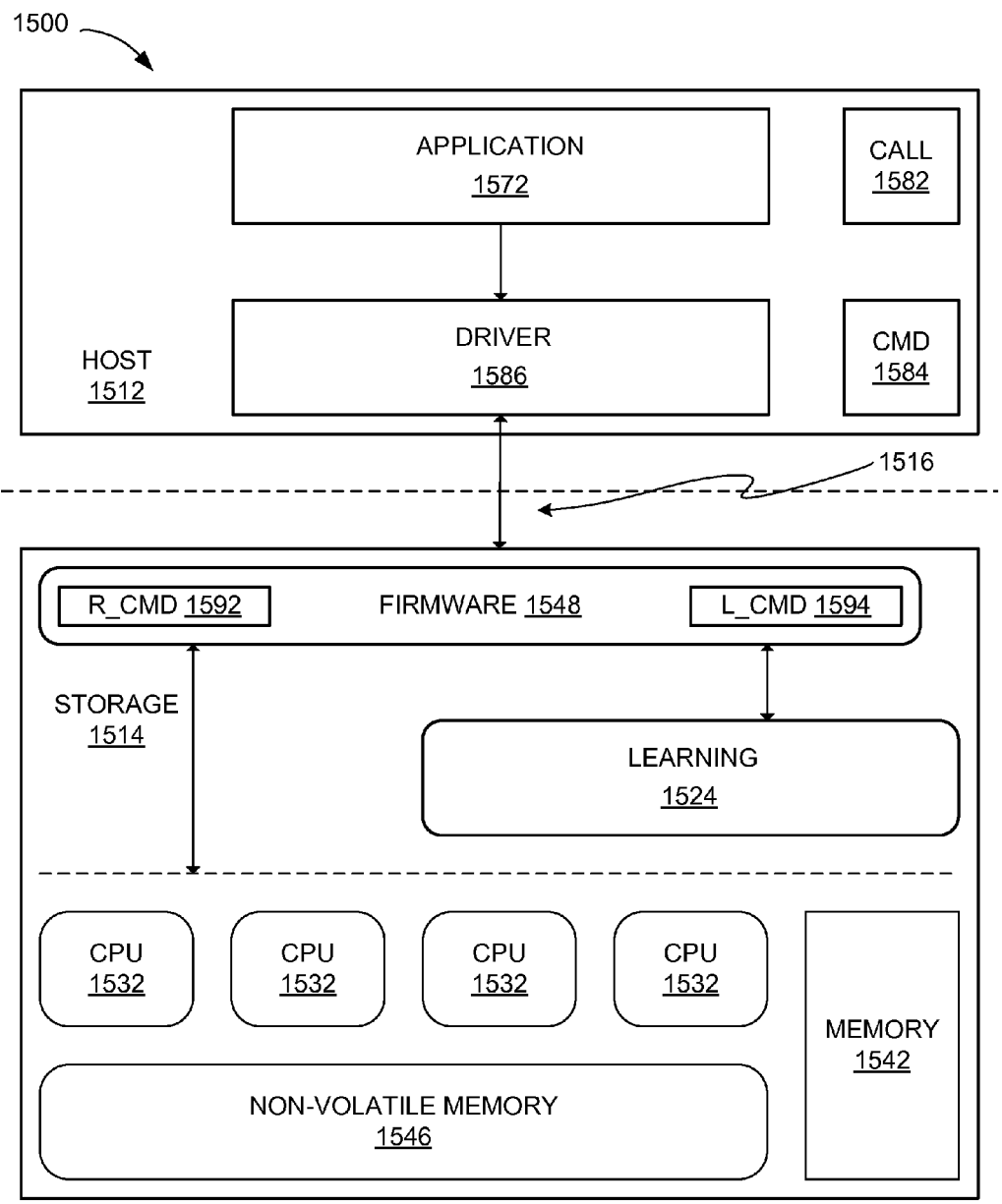
FIG. 15 is a block diagram of a portion of an electronic learning system of the electronic system in an embodiment of the invention.

Referring now to FIG. 15, therein is shown a block diagram of a portion of an electronic learning system 1500 of the electronic system 100 in an embodiment of the invention. The electronic learning system 1500 can be implemented with the first device 102 of FIG. 1, the second device 106 of FIG. 1, integrated circuits, integrated circuit cores, integrated circuit components, microelectromechanical system (MEMS), passive devices, or a combination thereof.

In an embodiment, the electronic learning system 1500 can provide machine learning. Machine learning can include algorithms that can learn from data including artificial intelligence, getting computers to act without being explicitly programmed, automated reasoning, automated adaptation, automated decision making, automated learning, ability for a computer to learn without being explicitly programmed, artificial intelligence (AI), or combination thereof. Machine learning can be considered a type of artificial intelligence (AI). Machine learning can be implemented when designing and programming explicit, rule-based algorithms is infeasible.

In an embodiment, the electronic learning system 1500 provide machine learning including prediction, recommendation, filtering, machine learning processes, machine learning functions, or combination thereof. In some embodiments, prediction, for example, can be based on clicking or selecting an advertisement or advertiser, can recommend an item or items, can filter spam, can include like processes, or combination thereof, to provide parallel or distributed machine learning such as for big data analytics.

For example, the electronic learning system 1500 can include parallel or distributed machine learning, including cluster computing, for parallel processing in system processors as well as in storage computing (ISC) processors. The parallel or distributed machine learning for parallel processing can be implemented at least with the first control unit 112 of FIG. 1, the second control unit 134 of FIG. 1, the first storage unit 114 of FIG. 1, the second storage unit 146 of FIG. 1, the first storage control unit 132 of FIG. 1, the second storage control unit 152 of FIG. 1, the first storage media 126 of FIG. 1, the second storage media 142 of FIG. 1, or combination thereof.

In an embodiment, the electronic learning system 1500 can include a host device 1512 such as a system device, a storage device 1514, or combination thereof. The host device 1512 and the storage device can be implemented with the first device 102, any sub-components of the first device 102, the second device 106, any sub-components of the second device 106, integrated circuits, integrated circuit cores, integrated circuit components, microelectromechanical system (MEMS), passive devices, or a combination thereof.

In an embodiment, the host device 1512 can communicate with the storage device 1514 with an interface 1516. The interface 1516 can include serial attached small computer system interface (SAS), serial attached advanced technology attachment (SATA), non-volatile memory express (NVMe), Fiber channel (FC), Ethernet, remote direct memory access (RDMA), InfiniBand (IB), any interface, or combination thereof.

In an embodiment, the storage device 1514 can include a learning engine 1524, storage central processing unit (CPU) 1532, or combination thereof. One or more of the storage CPUs 1524 can provide parallel or distributed machine learning, including cluster computing, for parallel processing in system processors as well as in storage computing (ISC) processors. For illustrative purposes, four of the storage CPUs 1532 are shown although it is understood that any number of storage CPUs may be included.

In an embodiment, the storage device 1514 can include memory 1542, non-volatile memory 1546, firmware 1548, or combination thereof. The memory 1542 can include volatile memory such as dynamic random access memory (DRAM), static random access memory (SRAM), other memory technology, or combination thereof. The non-volatile memory 1546 can include flash drives, disk storage, non-volatile memory (NVM), other storage technology, or combination thereof. The firmware 1548 can be stored in a non-volatile storage device including read only memory (ROM), erasable programmable read only memory (EPROM), flash memory, other storage technology, or combination thereof. The memory 1542, the non-volatile memory 1546, the firmware 1548, or combination thereof, can be implemented with integrated circuits, integrated circuit cores, integrated circuit components, passive devices, or a combination thereof.

In an embodiment, the memory 1542, the non-volatile memory 1546, the firmware 1548, or combination thereof, can store relevant information for the storage device 1514. The relevant information can include incoming data, previously presented data, temporary data, any form of social network day, user profiles, behavior data, cookies, any form of a large collection of user data, or a combination thereof, for operation of the storage device 1514.

In an embodiment, the host device 1512 can include an application 1572 such as parallel or distributed machine learning applications, system calls 1582, system commands 1584, a driver 1586 such as a device driver, or combination thereof. The application 1572 can provide the system call 1582 including system status, input and output control (Ioctl), "LEARN" such as the "LEARN" command of FIG. 10, metadata, any system call, or combination thereof, for the driver 1586. The driver 1586 can provide the system commands 1584 for the storage device 1514 based on the system calls 1582.

For example, the system calls 1582, the system commands 1584, or combination thereof, can be based on detecting, identifying, monitoring, measuring, checking, or combination thereof, potential issues or bottlenecks with system resources. The issues or bottlenecks can include resource saturation, pressure, limited resource, or combination thereof, of any system resource including the interface 1516. The detecting, identifying, monitoring, measuring, checking, or combination thereof, provides intelligence in implementing parallel or distributed processing for the learning engine 1524, the system calls 1582, the system commands 1584, or combination thereof.

In an embodiment, the system commands 1584 of the driver 1586 can be divided, partitioned, selected, or combination thereof, for the learning engine 1524, the storage CPU 1532, the host 1512 or combination thereof. The firmware 1548 can divide, partition, select, or combination thereof, the system commands 1584 into regular commands 1592 for the storage CPU 1532 and learning commands 1594 for the learning engine 1524. The learning commands 1594 such as machine learning commands, can provide parallel or distributed machine learning, including cluster computing, for parallel processing in the storage CPUs 1532. The regular commands 1592 can include system commands 1594 for the storage device 1514 that do not require machine learning.

It has been discovered that the electronic learning system 1500 with the host device 1512, the storage device 1514, the system calls 1582, the system commands 1584, the learning engine 1524, the storage CPU 1532, or combination thereof, provide intelligent parallel or distributed machine learning, including cluster computing, for parallel processing. The system calls 1582, the system commands 1584, or combination thereof, provides the intelligence for parallel processing with the storage CPUs 1532.

Figure 16:
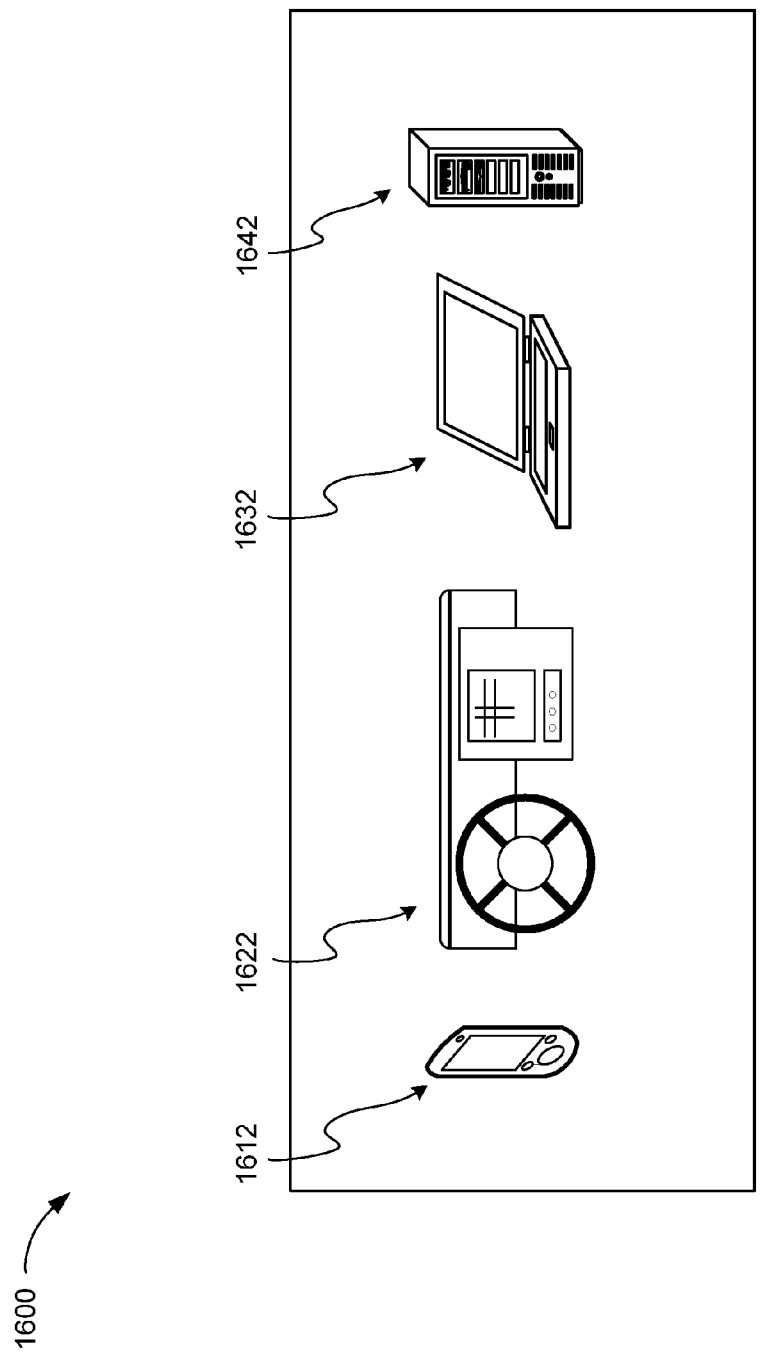
FIG. 16 is examples of embodiments of the electronic system.

Referring now to FIG. 16, therein is shown examples of embodiments of the electronic system 100. The example embodiments of the electronic system 100 with partitioning mechanism can include application examples for the electronic system 100 such as a smart phone 1612, a dash board of an automobile 1622, a notebook computer 1632, a server 1642, or combination thereof. These application examples illustrate purposes or functions of various embodiments of the invention and importance of improvements in processing performance including improved bandwidth, area-efficiency, or combination thereof.

For example, the storage device 1114 of FIG. 11 can provide significantly improved system performance and avoid issues, bottlenecks, resource saturation, pressure, limited resource, or combination thereof, in the electronic system 100 such as a smart phone 1612, a dash board of an automobile 1622, a notebook computer 1632, a server 1642, or combination thereof. The adaptive block 1130 of FIG. 11, the scheduler block 1084 of FIG. 10, or combination thereof, of the storage device 1114 can intelligently select, partition, parallel, divide, or combination thereof, machine learning.

For example, the first compute device 1312 of FIG. 13 can provide significantly improved system performance and avoid issues, bottlenecks, resource saturation, pressure, limited resource, or combination thereof, in the electronic system 100 such as a smart phone 1612, a dash board of an automobile 1622, a notebook computer 1632, a server 1642, or combination thereof. The scheduler 1380 of FIG. 13 can intelligently select, partition, parallel, divide, or combination thereof, machine learning.

For example, the storage device 1514 of FIG. 15 can provide significantly improved system performance and avoid issues, bottlenecks, resource saturation, pressure, limited resource, or combination thereof, in the electronic system 100 such as a smart phone 1612, a dash board of an automobile 1622, a notebook computer 1632, a server 1642, or combination thereof. The learning engine 1524 of FIG. 15 of the storage device 1514 of FIG. 15 can intelligently select, partition, parallel, divide, or combination thereof, machine learning.

In an example where an embodiment of the invention is an integrated physical logic circuit and the storage device 1114, the storage device 1314 of FIG. 13, the storage device 1514, or combination thereof, is integrated in the control unit 112 of FIG. 1, the storage unit 114 of FIG. 1, the first storage media 126 of FIG. 1, the second storage media 142 of FIG. 1, or combination thereof, selecting, partitioning, paralleling, dividing, or combination thereof, of machine learning can significantly improve system performance. Various embodiments of the invention provide selecting, partitioning, paralleling, dividing, or combination thereof, of machine learning thereby improving system performance, improving energy efficiency, enabling new technologies, enabling compatibility with current hierarchies, providing transparent implementation for user applications, or combination thereof.

The electronic system 100, such as the smart phone 1612, the dash board of the automobile 1622, the notebook computer 1632, and the server 1642, can include a one or more of a subsystem (not shown), such as a printed circuit board having various embodiments of the invention, or an electronic assembly (not shown) having various embodiments of the invention. The electronic system 100 can also be implemented as an adapter card in the smart phone 1612, the dash board of the automobile 1622, the notebook computer 1632, and the server 1642.

Thus, the smart phone 1612, the dash board of the automobile 1622, the notebook computer 1632, the server 1642, other electronic devices, or combination thereof, can provide significantly faster throughput with the electronic system 100 such as processing, output, transmission, storage, communication, display, other electronic functions, or combination thereof. For illustrative purposes, the smart phone 1612, the dash board of the automobile 1622, the notebook computer 1632, the server 1642, other electronic devices, or combination thereof, are shown although it is understood that the electronic system 100 can be used in any electronic device.

Figure 17:
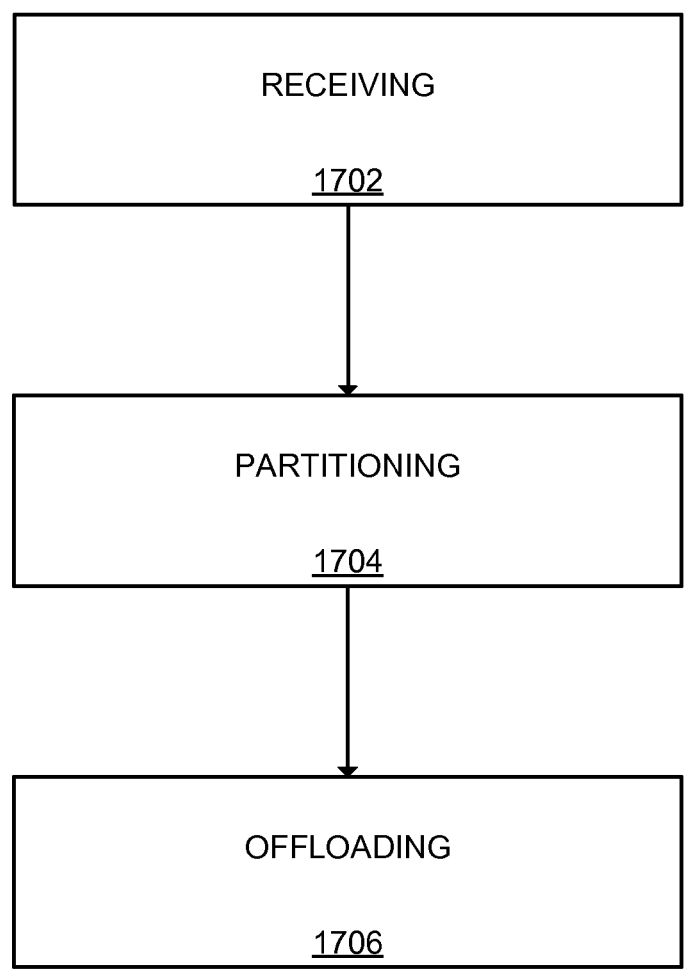
FIG. 17 is a flow chart of a method of operation of the electronic system in an embodiment of the present invention.

Referring now to FIG. 17, therein is shown a flow chart of a method 1700 of operation of the electronic system 100 in an embodiment of the present invention. The method 1700 includes: receiving system information with a storage interface in a block 1702; partitioning data, with a storage control unit configured to implement a preprocessing block, based on the system information in a block 1704; and distributing machine learning for processing partial data of the data, with the storage control unit configured to implement a learning block in a block 1706.

In an embodiment, the method 1700 for the block 1704 can include the storage control unit configured to implement a preprocessing block. The method 1700 for the block 1704 can include the storage control unit configured to implement a programming interface.

In an embodiment the method 1700 for the block 1704 can include the storage unit configured to implement a selection block. The method 1700 for the block 1704 can include the storage control unit configured to implement a scan and select block.

The method 1700 for the block 1706 can include the storage control unit configured to implement a scheduler block.

The method 1700 can further include storing data with a storage media configured to store the data.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance. These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
    a storage interface configured to provide communication between a storage device and a system device;
    a storage control unit included in the storage device and coupled to the storage interface, configured to implement:
    a preprocessing block for partitioning data into first partial data to be processed by the storage device and second partial data to be processed by the system device to implement a distributed machine learning process, the partitioning based on input/output utilization of the storage interface between the system device and the storage device; and
    a learning block for processing the first partial data as part of the distributed machine learning process.

2. The system as claimed in claim 1 wherein the storage control unit is configured to implement an adaptive preprocessing block.

3. The system as claimed in claim 1 wherein the storage control unit is configured to implement a programming interface.

4. The system as claimed in claim 1 wherein the storage control unit is configured to implement a scheduler block.

5. The system as claimed in claim 1 wherein the storage control unit is configured to implement a selection block.

6. The system as claimed in claim 1 wherein the storage control unit is configured to implement a scan and select block.

7. The system as claimed in claim 1 wherein the preprocessing block for partitioning the data based on input/output utilization includes partitioning based on saturation of the input/output.

8. A method of operation of an electronic system comprising:
    partitioning data, with a storage control unit included in a storage device and configured to implement a preprocessing block, into first partial data to be processed by the storage device and second partial data to be processed by a system device to implement a distributed machine learning process, the partitioning based on input/output utilization of a storage interface between the system device and the storage device; and
    distributing the second partial data to the system device and the first partial data to a learning block of the storage device, wherein the learning block implements part of the distributed machine learning process.

9. The method as claimed in claim 8 wherein partitioning the data includes the storage control unit configured to implement an adaptive preprocessing block.

10. The method as claimed in claim 8 wherein partitioning the data includes the storage control unit configured to implement a programming interface.

11. The method as claimed in claim 8 wherein distributing machine learning processing includes the storage control unit configured to implement a scheduler block.

12. The method as claimed in claim 8 wherein partitioning the data includes the storage control unit configured to implement a selection block.

13. The method as claimed in claim 8 wherein partitioning the data includes the storage control unit configured to implement a scan and select block.

14. The method as claimed in claim 8 wherein partitioning the data based on input/output utilization includes partitioning based on saturation of the input/output.

15. A non-transitory computer readable medium including stored thereon instructions to be executed by a control unit comprising:

partitioning data, with a storage control unit included in a storage device and configured to implement a preprocessing block, into first partial data to be processed by the storage device and second partial data to be processed by a system device to implement a distributed machine learning process, the partitioning based on input/output utilization of a storage interface between the system device and the storage device; and distributing the second partial data to the system device and the first partial data to a learning block of the storage device, wherein the learning block implements part of the distributed machine learning process.

16. The medium as claimed in claim 15 wherein partitioning the data includes the storage control unit configured to implement an adaptive preprocessing block.

17. The medium as claimed in claim 15 wherein partitioning the data includes the storage control unit configured to implement a programming interface.

18. The medium as claimed in claim 15 wherein distributing machine learning processing includes the storage control unit configured to implement a scheduler block.

19. The medium as claimed in claim 15 wherein partitioning the data includes the storage control unit configured to implement a selection block.

20. The medium as claimed in claim 15 wherein partitioning the data includes the storage control unit configured to implement a scan and select block.

21. The medium as claimed in claim 15 wherein partitioning the data based on input/output utilization includes partitioning based on saturation of the input/output.

* * * * *